(12) United States Patent
Kambara et al.

(10) Patent No.: US 9,806,373 B2
(45) Date of Patent: Oct. 31, 2017

(54) SOLID ELECTROLYTE

(71) Applicant: IDEMITSU KOSAN CO., LTD, Chiyoda-ku (JP)

(72) Inventors: Takayoshi Kambara, Sodegaura (JP); Tadanori Junke, Sodegaura (JP); Ryo Aburatani, Sodegaura (JP); Hiroyuki Higuchi, Sodegaura (JP); Masaru Nakagawa, Sodegaura (JP); Tsuyoshi Ota, Sodegaura (JP); Yoshikatsu Seino, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/442,800

(22) Filed: Feb. 27, 2017

(65) Prior Publication Data

US 2017/0194662 A1    Jul. 6, 2017

Related U.S. Application Data

(63) Continuation of application No. 14/355,715, filed as application No. PCT/JP2012/007053 on Nov. 2, 2012, now Pat. No. 9,620,811.

(30) Foreign Application Priority Data

| Nov. 7, 2011 | (JP) | 2011-243459 |
| Jan. 10, 2012 | (JP) | 2012-002228 |
| Feb. 21, 2012 | (JP) | 2012-034890 |
| Jun. 29, 2012 | (JP) | 2012-147050 |

(51) Int. Cl.
*H01M 10/0562* (2010.01)
*H01M 10/0525* (2010.01)
*C03C 10/16* (2006.01)
*H01B 1/12* (2006.01)

(52) U.S. Cl.
CPC ......... *H01M 10/0562* (2013.01); *C03C 10/16* (2013.01); *H01B 1/122* (2013.01); *H01M 10/0525* (2013.01); *C03C 2205/00* (2013.01); *H01M 2300/008* (2013.01)

(58) Field of Classification Search
None
See application file for complete search history.

(56) References Cited

U.S. PATENT DOCUMENTS

| 2007/0160911 A1 | 7/2007 | Senga et al. |
| 2009/0159839 A1 | 6/2009 | Seino et al. |
| 2010/0290969 A1 | 11/2010 | Deiseroth et al. |
| 2011/0081580 A1 | 4/2011 | Stadler et al. |

(Continued)

FOREIGN PATENT DOCUMENTS

| JP | 10-321256 A | 12/1998 |
| JP | 2003-346896 A | 12/2003 |

(Continued)

OTHER PUBLICATIONS

International Search Report dated Jan. 29, 2013 in PCT/JP2012/007053 (English translation only).

(Continued)

*Primary Examiner* — Sarah A Slifka
(74) *Attorney, Agent, or Firm* — Oblon, McClelland, Maier & Neustadt, L.L.P.

(57) ABSTRACT

A solid electrolyte including an alkali metal element, phosphorous, sulfur and halogen as constituent components.

17 Claims, 3 Drawing Sheets

(56) References Cited

U.S. PATENT DOCUMENTS

| | | | |
|---|---|---|---|
| 2012/0034529 | A1 | 2/2012 | Tatsumisago et al. |
| 2012/0319034 | A1 | 12/2012 | Awano et al. |
| 2013/0164631 | A1 | 6/2013 | Ohtomo et al. |
| 2013/0177821 | A1 | 7/2013 | Tsuchida et al. |
| 2014/0141341 | A1 | 5/2014 | Ohtomo et al. |

FOREIGN PATENT DOCUMENTS

| | | |
|---|---|---|
| JP | 2005-228570 A | 8/2005 |
| JP | 2010-199033 A | 9/2010 |
| JP | 2011-124081 A | 6/2011 |
| JP | 2012-48971 A | 3/2012 |
| JP | 2012-48973 A | 3/2012 |
| JP | 2012-104279 A | 5/2012 |
| WO | WO 2007/066539 A1 | 6/2007 |
| WO | WO 2011-065401 A1 | 6/2011 |
| WO | WO 2013/005085 A1 | 1/2013 |

OTHER PUBLICATIONS

Hans-Jörg Deiseroth, et al., "$Li_6PS_5X$: A Class of Crystalline Li-Rich Solids With an Unusually High $Li^+$ Mobility" Angewandte Chemie, Int. Ed., vol. 47, 2008, pp. 755-758.

Extended European Search Report dated Sep. 2, 2015 in Patent Application No. 12846932.7.

F. Stadler et al.. "Crystalline halide substituted Li-argyrodites as solid electrolyte for lithium ion batteries", The Electrochemical Society, 216th Meeting, Abstract #590, Dec. 31, 2009, 1 page.

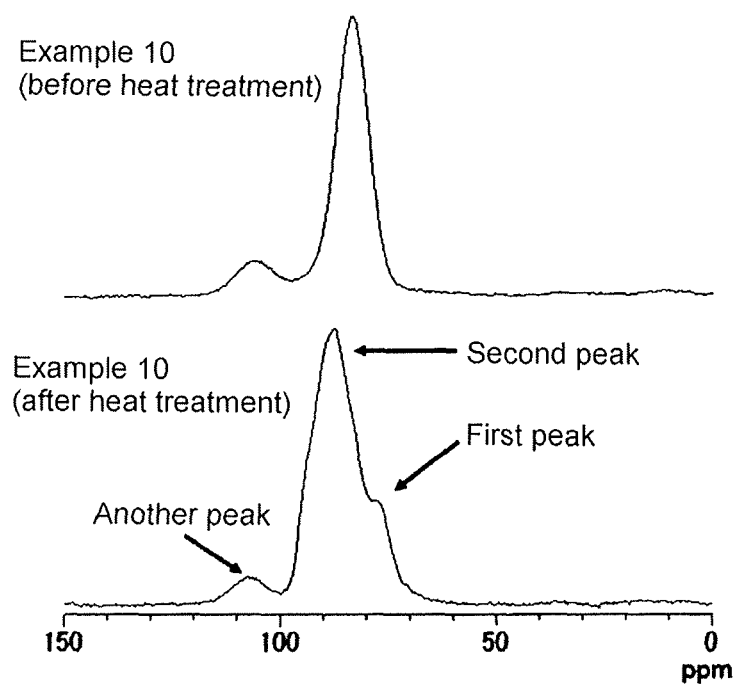

SOLID ELECTROLYTE

CROSS REFERENCE TO RELATED APPLICATIONS

This application is a continuation of U.S. patent application Ser. No. 14/355,715, filed May 1, 2014, now allowed; which is a 371 of PCT/JP2012/007053, filed Nov. 2, 2012, the disclosures of which are incorporated herein by reference in their entireties. This application claims priority to Japanese Patent Application Nos. Japan 2011-243459, filed Nov. 7, 2011; Japan 2012-002228, filed Japan Jan. 10, 2012; Japan 2012-034890, filed Feb. 21, 2012; and Japan 2012-147050, filed Jun. 29, 2012, the disclosures of which are incorporated herein by reference in its entirety.

TECHNICAL FIELD

The invention relates to a solid electrolyte.

BACKGROUND ART

In the field of an all-solid-battery, conventionally, a sulfide-based solid electrolyte material has been known. For example, Patent Document 1 reports that, by mixing $Li_2S$ and $P_2S_5$ at a specific molar ratio (68:32 to 73:27), subjecting the mixture to a mechanical milling treatment, followed by a heat treatment, glass ceramics electrolyte particles having a high ionic conductivity ($2×10^{-3}$ S/cm or less) can be obtained. However, this material tends to be easily hydrolyzed (it generated hydrogen sulfide by contacting water), and hence, the use thereof in a high dew point environment is limited.

A technology of suppressing this tendency of being hydrolyzed is proposed in Patent Document 2. However, this technology has a problem that the ionic conductivity is greatly lowered when suppressing hydrolyzability.

RELATED ART DOCUMENTS

Patent Documents

Patent Document 1: JP-A-2005-228570
Patent Document 2: JP-A-2010-199033

SUMMARY OF THE INVENTION

An object of the invention is to provide a solid electrolyte that is hardly hydrolyzed and has a high ionic conductivity.

According to the invention, the following solid electrolyte or the like are provided.

1. A solid electrolyte comprising an alkali metal element, phosphorous, sulfur and halogen as constituent components.
2. The solid electrolyte according to 1, wherein the alkali metal element is lithium.
3. The solid electrolyte according to 1 or 2 having a peak in a peak region of 75.0 ppm or more and 80.0 ppm or less in the $^{31}$P-NMR spectrum.
4. The solid electrolyte according to any of 1 to 3 having a peak in a peak region of 86.0 ppm or more and 92.0 ppm or less in the $^{31}$P-NMR spectrum.
5. The solid electrolyte according to any of 1 to 4, wherein it has a first peak in a first peak region of 75.0 ppm or more and 80.0 ppm or less in the $^{31}$P-NMR spectrum, and the intensity ratio of a peak in a region other than the first peak region and a second peak region of 86.0 ppm or more and 92.0 ppm or less is 0.5 or less relative to the first peak.
6. The solid electrolyte according to 5 having a peak in the first peak region and a peak in the second peak region.
7. The solid electrolyte according to 6, wherein the intensity ratio ($I_2/I_1$) of a second peak ($I_2$) in the second peak region relative to the first peak ($I_1$) is 1 to 10.
8. The solid electrolyte according to any of 5 to 7 having an ionic conductivity of $5×10^{-4}$ S/cm or more.
9. The solid electrolyte according to any of 5 to 8 having an average hydrogen sulfide concentration measured by a hydrolysis test of 200 ppm or less.
10. The solid electrolyte according to any of 1 to 4 having an ionic conductivity of $3×10^{-4}$ S/cm or more.
11. The solid electrolyte according to any of 1 to 4 and 10 having an average hydrogen sulfide concentration measured by a hydrolysis test of 200 ppm or less.
12. The solid electrolyte according to any of 1 to 11 having a composition represented by the following formula (A'):

$$L_aM_bP_cS_dX_e \qquad (A')$$

wherein L is an alkali metal; M is B, Al, Si, Ge, As, Se, Sn, Sb, Te, Pb or Bi or a combination thereof; X is I, Cl, Br or F or a combination thereof; and a, b, c, d and e satisfy $0<a≤12$, $0≤b≤0.2$, $c=1$, $0<d≤9$ and $0<e≤9$.
13. The solid electrolyte according to 12, wherein b is 0.
14. The solid electrolyte according to 12, wherein d is 4.
15. The solid electrolyte according to any of 12 to 14, wherein X is I, Br or Cl.
16. The solid electrolyte according to any of 12 to 15 having a crystalline structure.
17. The solid electrolyte according to any of 12 to 14 that is amorphous, wherein X is Br or Cl.
18. The solid electrolyte according to any of 12 to 17 that is obtained from raw materials of lithium sulfide and phosphorous sulfide; sulfur and phosphorous; phosphorous sulfide and sulfur; or phosphorous sulfide, sulfur and phosphorous; and
a compound represented by the following formula (E'):

$$M_wX_x \qquad (E')$$

wherein M is Li, B, Al, Si, P, S, Ge, As, Se, Sn, Sb, Te, Pb or Bi; X is F, Cl, Br or I; and w is an integer of 1 or 2 and x is an integer of 1 to 10.
19. The solid electrolyte according to 18, wherein M is P and X is Br, I or Cl.
20. The solid electrolyte according to 18, wherein M is Li and X is Br, I or Cl.
21. The solid electrolyte according to any of 12 to 15 and 17 to 20 that is amorphous and has two crystallization peaks in a thermo gravimetric-differential thermal measurement.
22. The solid electrolyte according to 22, wherein the two crystallization peaks appear in a range of 150° C. or higher and 360° C. or lower.
23. The solid electrolyte according to 21 or 22, wherein the distance between the two crystallization peaks is 20 to 100° C.
24. A solid electrolyte that is obtained by heating at a temperature of 150° C. or higher and 360° C. or lower the solid electrolyte according to any of 12 to 15 and 17 to 23 that is amorphous.
25. A solid electrolyte that is obtained by heating the solid electrolyte according to any of 21 to 23 at a temperature between the temperatures indicated by the two crystallization peaks.

26. An electrolyte-containing material comprising the solid electrolyte according to any of 1 to 4 and 10 to 25.
27. An electrolyte layer comprising any of the solid electrolyte according to any of 1 to 4 and 10 to 25 and the electrolyte-containing material according to 26.
28. An electrolyte layer that is produced by using at least one of the solid electrolyte according to any of 1 to 4 and 10 to 25 and the electrolyte-containing material according to 26.
29. A battery wherein at least one of a cathode layer, an electrolyte layer and an anode layer comprises the solid electrolyte according to any of 1 to 4 and 10 to 25 and the electrolyte-containing material according to 26.
30. A battery wherein at least one of a cathode layer, an electrolyte layer and an anode layer is produced by using at least one of the solid electrolyte according to any of 1 to 4 and 10 to 25 and the electrolyte-containing material according to 26.
31. An electrolyte-containing material comprising the solid electrolyte according to any of 5 to 9.
32. An electrolyte layer comprising the solid electrolyte according to any of 5 to 9 and the electrolyte-containing material according to 31.
33. An electrolyte layer that is produced by using at least one of the solid electrolyte according to any of 5 to 9 and the electrolyte-containing material according to 31.
34. A battery wherein at least one of a cathode layer, an electrolyte layer and an anode layer comprises at least one of the solid electrolyte according to any of 5 to 9 and the electrolyte-containing material according to 31.
35. A battery wherein at least one of a cathode layer, an electrolyte layer and an anode layer is produced by using at least one of the solid electrolyte according to any of 5 to 9 and the electrolyte-containing material according to 31.

According to the invention, a solid electrolyte which is not hydrolyzed easily and has a high ionic conductivity can be provided.

BRIEF DESCRIPTION OF THE DRAWINGS

FIG. 5 is the $^{31}$P-NMR spectrum of the solid electrolyte (sulfide-based glass) obtained in Example 10(1) and the $^{31}$P-NMR spectrum of the solid electrolyte (sulfide-based glass ceramics) obtained in Example 10(2);

MODE FOR CARRYING OUT THE INVENTION

Figure 1:
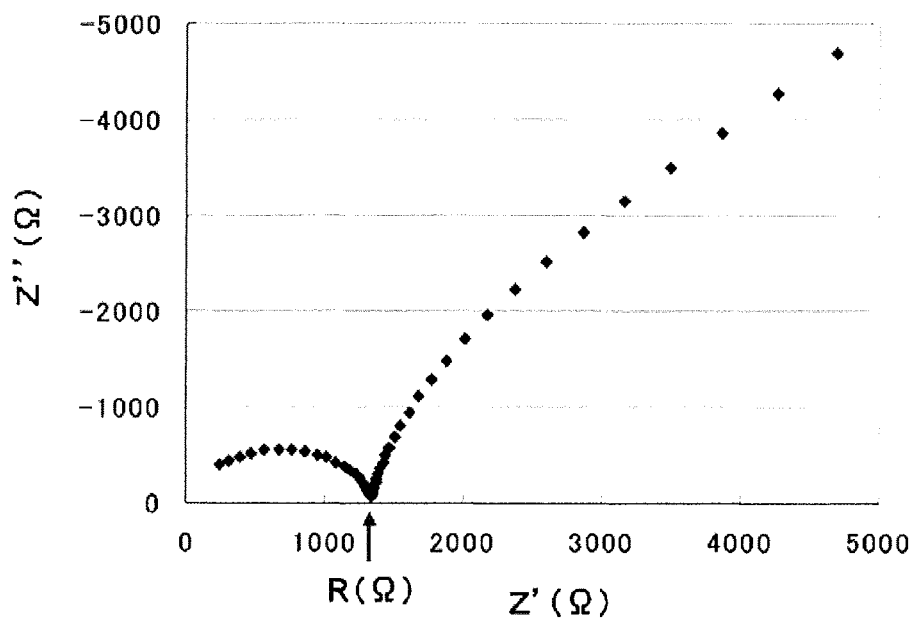
FIG. 1 shows one example of a Cole-Cole plot.

A first solid electrolyte of the invention comprises, as constituent components, an alkali metal element, phosphorous, sulfur and a halogen.

It is preferred that, in the $^{31}$P-NMR spectrum, the first solid electrolyte of the invention have a peak (hereinafter referred to as the "first peak") in a peak region of 75.0 ppm or more and 80.0 ppm or less (hereinafter referred to as the "first peak region"). The solid electrolyte specified by this peak conditions is hardly hydrolyzed and has a high ionic conductivity.

Here, the first peak may be a shoulder peak. The shoulder peak means a smaller peak that appears as part of a larger peak when two or more peaks differing in size overlap.

When there is no clear maximum point and the position of a peak top cannot be understood, the peak position of the shoulder peak is a position at which the absolute value of the differential value in a peak region of 75.0 ppm or more and 80.0 ppm or less becomes the smallest.

It is more preferred that the first solid electrolyte of the invention have a peak in (hereinafter referred to as the "second peak") in a peak region of 86.0 ppm or more and 92.0 ppm or less (hereinafter referred to as the "second peak region"). The solid electrolyte specified by the above-mentioned peak conditions is hardly hydrolyzed and has a high ionic conductivity.

The second peak may also be a shoulder peak. When there is no clear maximum point and the position of a peak top cannot be understood, the peak position of the shoulder peak is a position at which the absolute value of the differential value in the second peak region becomes the smallest.

It is further preferred that, in the $^{31}$P-NMR spectrum, the first solid electrolyte of the invention have the first peak in the first peak region (the intensity of the first peak is expressed as $I_1$) and the intensity ratio ($I_c/I_1$) of a peak (the intensity thereof is expressed as $I_c$) in other regions than the first peak region and the second peak region to the first peak be 0.5 or less.

The solid electrolyte specified by the above-mentioned peak conditions is hardly hydrolyzed and has a high ionic conductivity.

In the invention, measurement of the $^{31}$P-NMR spectrum is conducted at room temperature by using an NMR apparatus (JNM-CMXP302 manufactured by JEOL Ltd. that was provided with a 5 mmCP/MAS probe). The $^{31}$P-NMR spectrum is measured by the single pulse method with a 90° pulse of 4 ρs and a rotation of a magic angle of 8.6 kHz. The chemical shift is measured by using ammonium hydrogen phosphate as an external standard (1.3 ppm). The measurement range is 0 ppm to 150 ppm.

The peak intensity is the height from the baseline to the peak top.

The first peak is preferably in a range of 75.5 ppm or more and 79.5 ppm or less, more preferably in a range of 76.0 ppm or more and 79.0 ppm or less.

The second peak is preferably in a range of 86.5 ppm or more and 91.5 ppm or less, more preferably in a range of 87.0 ppm or more and 91.0 ppm or less.

The first solid electrolyte of the invention preferably has a peak in the first peak region and a peak in the second peak region.

The intensity ratio of the second peak to the first peak ($I_2/I_1$) is preferably 1 or more and 10 or less, with 1.2 or more and 5 or less being further preferable.

A peak may or may not appear in a region other than the first region and the second region. If a peak appears in other regions than the first region and the second region, the intensity ratio ($I_c/I_1$) of this peak to the first peak is preferably 0.5 or less. The intensity ratio is preferably 0.45 or less, more preferably 0.4 or less, further preferably 0.3 or less, with 0.25 or less being most preferable.

If there is a plurality of peaks in the first peak region, the intensity of the largest peak among them is taken as $I_1$. If there is a plurality of peaks in the second peak region, the intensity of the largest peak among them is taken as $I_2$. If there is a plurality of peaks in other regions than the first region and the second region, the intensity of the largest peak among them is taken as Ic.

According to a sample, the first peak may appear as a shoulder peak. If there is no clear maximum point and the position of the peak top cannot be shown clearly, a position where the absolute value of a value obtained by differentiating the first peak region becomes the smallest is taken as the first peak position.

The second solid electrolyte of the invention is a solid electrolyte comprising an alkali metal element as a constituting component and having a diffraction peak at least at 2θ=16.3±0.3 deg, 21.3±0.3 deg and 33.1±0.8 deg in the powder X-ray diffraction (CuKα: λ=1.5418 Å).

The solid electrolyte specified by the above-mentioned peak conditions is hardly hydrolyzed and has a high ionic conductivity.

The second solid electrolyte of the invention is a solid electrolyte comprising an alkali metal element as a constituent component and having diffraction peaks preferably at least at 2θ=16.3±0.3 deg, 21.3±0.3 deg and 33.1±0.5 deg in the powder X-ray diffraction analysis (CuKα: λ=1.5418 Å).

The second solid electrolyte of the invention is a solid electrolyte having diffraction peaks more preferably at least at 2θ=16.3±0.3 deg, 21.3±0.3 deg, and 33.1±0.5 deg in the powder X-ray diffraction analysis (CuKα: λ=1.5418 Å), further preferably at least at 2θ=15.6±0.3 deg, 16.3±0.3 deg, 21.3±0.3 deg, 30.1±0.5 deg, 31.5±0.3 deg an 33.1±0.3 deg and particularly preferably at least at 2θ=15.6±0.3 deg, 16.3±0.3 deg, 21.3±0.3 deg, 30.1±0.3 deg or 29.8±0.3 deg, 31.5±0.3 deg and 33.1±0.3 deg.

For example, it may have a diffraction peak at 2θ=15.6±0.3 deg, 16.3±0.3 deg, 21.3±0.3 deg, 25.1±0.3 deg, 30.1±0.3 deg, 31.5±0.3 deg and 33.1±0.3 deg.

The "having diffraction peaks at least at 2θ=15.6±0.3 deg, 16.3±0.3 deg, 21.3±0.3 deg, 30.1±0.3 deg or 29.8±0.3 deg, 31.5±0.3 deg and 33.1±0.3 deg" means that "having diffraction peaks at least at 2θ=15.6±0.3 deg, 16.3±0.3 deg, 21.3±0.3 deg, 30.1±0.3 deg, 31.5±0.3 deg and 33.1±0.3 deg" or "having diffraction peaks at least at 2θ=15.6±0.3 deg, 16.3±0.3 deg, 21.3±0.3 deg, 29.8±0.3 deg, 31.5±0.3 deg and 33.1±0.3 deg".

The second solid electrolyte of the invention has a diffraction peak preferably at least at 2θ=16.3±0.3 deg, 21.3±0.3 deg, 31.5±0.3 deg and 32.6±0.3 deg, further preferably at 2θ=15.6±0.3 deg, 16.3±0.3 deg, 21.3±0.3 deg, 31.5±0.3 deg and 32.6±0.3 deg in the powder X-ray diffraction analysis (CuKα: λ=1.5418 Å).

The diffraction peak of the powder X-ray diffraction analysis (CuKα: λ=1.5418 Å) is a diffraction pattern obtained by irradiating the solid electrolyte with an X-ray beam (CuKα: λ=1.5418 Å).

The diffraction patterns mentioned above are obtained as follows. For example, a solid electrolyte sample to be measured is molded into a shape having a cross sectional diameter (φ) of 10 mm and a thickness of 0.1 to 1 mm. This sample specimen was attached to a sample jig for anaerobic measurement. The sample specimen in the fixture is placed in a Smart lab apparatus (manufactured by Rigaku Corporation), and then exposed to X-ray beam (CuKα: λ=1.5418 Å).

Raw materials may remain in the second solid electrolyte of the invention. For example, LiI, LiBr or LiCl may remain. Further, for example, lithium sulfide or phosphorous pentasulfide may remain. It is supposed that if the amount of remaining lithium sulfide or phosphorous pentasulfide is small, the ionic conductivity is increased.

The first solid electrolyte of the invention comprises an alkali metal element, a phosphorous element, a sulfur element and a halogen element as essential constituent components.

As for the alkali metal element, one or more selected from lithium, sodium potassium, rubidium, cesium and francium can be given. One or more selected from lithium and sodium are preferable, with lithium being more preferable.

The halogen is preferably one halogen atom selected from F, Cl, Br and I, more preferably Cl, Br or I, with Br or I being particularly preferable.

It is preferred that the solid electrolyte of the invention has the composition represented by the following formula (A):

$$L_a M_b F_c S_d X_e \qquad (A)$$

In the formula (A), L is an alkali metal, preferably lithium or sodium, with lithium being particularly preferable.

In the formula (A), M is an element represented by the following formula (B):

$$B_f Zn_g Si_h Cu_i Ga_j Ge_k \qquad (B)$$

In the formula (B), f to k are independently the composition ratio of each element. f to k are independently 0 or more and 1 or less, and f+g+h+i+j+k=1. The formula (B) shows one element selected from B, Zn, Si, Cu, Ga and Ge or a combination of two or more elements thereof.

In the formula (B), a case where f, i and j are 0, i.e. $Zn_g Si_h Ge_k$ (wherein g, h and k are 0 or more and 1 or less, and g+h+k=1), is preferable.

In the formula (A), X is represented by the following formula (C):

$$F_l Cl_m Br_n I_o \qquad (C)$$

In the formula (C), l, m, n and o are independently the composition ratio of each element. l, m, n and o are 0 or more and 1 or less, and l+m+n+o=1. The formula (C) shows one halogen element selected from F, Cl, Br and I or a combination of two or more halogen elements.

A case where l and m are 0, i.e. $Br_n I_o$ (wherein n and o are 0 or more and 1 or less, and n+o=1), is preferable.

It is preferred that X be at least one halogen atom selected from F, Cl, Br and I, with Br or I being preferable.

In the formula (A), a to e are independently the composition ratio of each element, and a:b:c:d:e satisfy 1 to 12:0 to 0.2:1:0 to 9:0 to 9.

It is preferred that b be 0, and it is more preferred that the ratio of a, c, d and e (a:c:d:e) be a:c:d:e=1 to 9:1:3 to 7:0.05 to 3, with a:c:d:e=2 to 4.5:1:3.5 to 5:0.1 to 1.5 being further preferable.

The solid electrolyte of the invention preferably has a composition represented by the following formula (A') in terms of stoichiometric ratio. The solid electrolyte may be a composite or a mixture of two or more compounds having the composition of the following formula (A').

$$L_a M_b P_c S_d X_e \qquad (A')$$

In the formula (A'), L is an alkali metal, and lithium and sodium are preferable, with lithium being particularly preferable.

In the formula (A'), M is an element represented by the following formula (B').

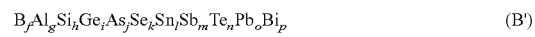

$$B_f Al_g Si_h Ge_i As_j Se_k Sn_l Sb_m Te_n Pb_o Bi_p \qquad (B')$$

In the formula (B'), f to p are the composition ratio of each element. f, g, h, i, j, k, l, m, o, p are independently 0 or more and 1 or less, and f+g+h+i+j+k+l+m+n+o+p=1. The formula (B') shows one element or a combination of two or more elements selected from B, Al, Si, P, S, Ge, As, Se, Sn, Sb, Te, Pb and Bi.

In the formula (B'), a case where i, j, k, l, m, n, o and p are 0, i.e., $B_f Al_g Si_h$ (wherein f, g and h are 0 or more and 1 or less and f+g+h=1), is preferable.

In the formula (A'), X is represented by the following formula (C').

$$F_s I_t Cl_u Br_v \qquad (C')$$

In the formula (C'), s, t, u and v are independently the composition ratio of each element. s, t, u and v are independently 0 or more and 1 or less and s+t+u+v=1. The formula (C') shows one halogen element selected from F, Cl, Br and I or a combination of two or more halogen elements.

A case where s and t are 0, i.e. $Cl_u Br_v$ (wherein u and v are 0 or more and 1 or less and u+v=1), is preferable. A case where s, t and u are 0, i.e. Br, is more preferable.

It is preferred that X be one halogen atom selected from F, Cl, Br and I. I, Br or Cl is particularly preferable, with Br being more preferable.

In the formula (A'), a to e are independently the composition ratio of each element, and satisfy $0<a\le12$, $0\le b\le0.2$, c=1, $0<d\le9$, $0<e\le9$.

It is preferred that b be 0, and it is more preferred that the ratio of a, c, d and e (a:c:d:e) be a:c:d:e=1 to 9:1:3 to 7:0.05 to 3, further preferably a:c:d:e=2 to 6.5:1:3.5 to 5:0.1 to 1.5. Most preferably, a:c:d:e=2 to 6.5:1:3.5 to 4.95:0.1 to 1.5.

d is preferably 4.

The composition ratio of each element can be controlled by adjusting the amount ratio of raw material compounds when producing the solid electrolyte of the invention or a precursor of the electrolyte.

It is preferred that the ionic conductivity of the solid electrolyte of the invention be $3\times10^{-4}$ S/cm or more, more preferably $5\times10^{-4}$ S/cm or more. The ionic conductivity is further preferably $7\times10^{-4}$ S/cm or more, with $9\times10^{-4}$ S/cm or more being most preferable.

A higher ionic conductivity is preferable. For example, as the upper limit of the ionic conductivity, $5\times10^{-2}$ S/cm or more can be mentioned.

In the invention, the ionic conductivity ($\sigma$) is measured as follows.

First, a sample is molded to have a shape having a cross section with a diameter of 10 mm (cross sectional area S=0.785 cm$^2$) and a height (L) of 0.1 to 0.3 cm. From the upper side and the lower side of the sample specimen, an electrode terminal is taken out. Measurement is conducted by the alternate impedance method (frequency range: 5 MHz to 0.5 Hz, amplitude: 10 mV), thereby to obtain a Cole-Cole plot. FIG. 1 shows one example of a Cole-Cole plot. In the vicinity of the right end of an arc observed in a high-frequency range, the real number part $Z'(\Omega)$ at a point where $-Z''(\Omega)$ becomes the smallest is taken as the bulk resistance $R(\Omega)$. According to the following formula, the ionic conductivity $\sigma$(S/cm) is calculated.

$$R=\rho(L/S)$$

$$\sigma=1/\rho$$

If the distance of the lead from the end surface of the sample specimen to the measurement apparatus is long, only a part of the right end of the arc is observed. However, in this case, the bulk resistance $R(\Omega)$ is judged in accordance with the method as mentioned above. Further, it may be a profile where an arc is not observed at all and $-Z''(\Omega)$ increases monotonically from in the vicinity of 0$\Omega$. In this case, $Z'(\Omega)$ when $-Z''(\Omega)=0$ is taken as the bulk resistance $R(\Omega)$.

In the invention, the measurement was conducted on the assumption that the lead distance was about 60 cm.

If the solid electrolyte of the invention is a sulfide-based solid electrolyte, the average value of a hydrogen sulfide concentration of a surrounding environment when the solid electrolyte is allowed to stand for 60 minutes in a circulation of wet air is preferably 200 ppm or less. The average value of a hydrogen sulfide concentration is more preferably 150 ppm or less, further preferably 100 ppm or less, with 20 ppm or less being particularly preferable.

In general, a sulfide-based solid electrolyte generates hydrogen sulfide when being hydrolyzed. In the solid electrolyte of the invention, since hydrolysis can be suppressed, the amount of hydrogen sulfide generated at the time of decomposition is decreased.

In the invention, a hydrolysis test is conducted by the following technique, and the obtained average value of a hydrogen sulfide concentration is used as an index of hydrolysis resistance.

Figure 2:
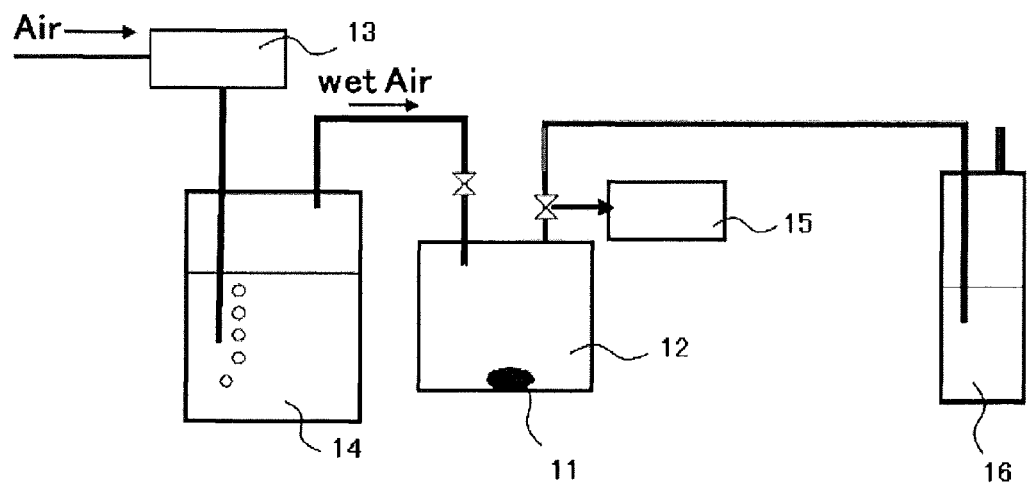
FIG. 2 is a view showing a schematic configuration of an apparatus for measuring the average value of a hydrogen sulfide concentration.

FIG. 2 is a view showing a schematic configuration of an apparatus for measuring the average value of a hydrogen sulfide concentration.

As the measurement sample 11, one which is thoroughly pulverized in a mortar in a nitrogen glove box in an environment where the dew point is −80° C. is used. 0.1 g of the measurement sample 11 is enclosed in a 100-ml Schlenk bottle 12.

Then, air that has been humidified (wet air) by passing through a water tank 14 is distributed in the Schlenk bottle 12 at a rate of 500 ml/min. The temperature of the wet air is about 25° C. and the humidity is about 80 to 90%. The flow rate of the air is controlled by a flow meter 13.

A gas discharged from the Schlenk bottle 12 during the period of time after 1 minute to 1 minute and 45 seconds from the start of the circulation is collected at a gas-collecting part 15, whereby a first sample gas for the measurement is obtained. As for the gas discharged at the time other than the gas collection time, the hydrogen sulfide is removed with an aqueous sodium hydroxide solution by a trap 16.

By using TS-100 (manufactured by Mitsubishi Chemical Analytech Co., Ltd.), the sulfur content is quantified by the UV fluorescence method, thereby to calculate the concentration of hydrogen sulfide in the sample gas. When the sample gas was subjected to a qualitative analysis by gas chromatography using the Agilent 6890 (provided with a sulfur selective detector (SIEVERS355)), it has been confirmed that 99% or more of the sulfur has been converted to a hydrogen sulfide gas.

As for the gas discharged from the Schlenk bottle 12 after the lapse of 5 minutes to 5 minutes and 45 seconds, after 10 minutes to 10 minutes and 45 seconds, after 20 minutes to 20 minutes and 45 seconds, after 60 minutes to 60 minutes and 45 seconds after the start of the circulation, the measurement is performed in the same manner as in the first sample gas.

The hydrogen sulfide concentration average value (ppm) is obtained from the measurement time and the hydrogen sulfide concentration.

Figure 3:
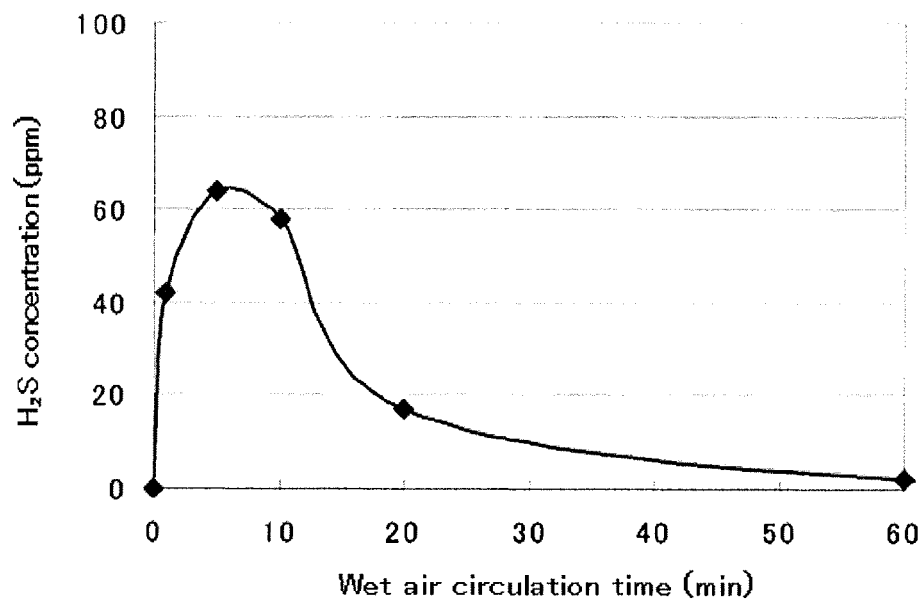
FIG. 3 shows an example of a measurement of a wet air passage time and a hydrogen sulfide concentration.

An example of the relationship between the wet air passage time and the hydrogen sulfide concentration is shown in FIG. 3. The curve is obtained by smoothing each measurement point. By dividing an area surrounded by this curve, the vertical axis and the horizontal axis (ppm·min) by the time (60 minutes), the average value of the hydrogen sulfide concentration (ppm) is obtained.

There is no particular limitation on the shape of the solid electrolyte of the invention, and the solid electrolyte may be in the form of a particle or in the form of a sheet.

If in the case of a particle, when forming an electrolyte layer, as mentioned later, by applying a slurry containing the solid electrolyte or a precursor thereof, an electrolyte layer can be produced. If an electrolyte sheet is produced by using the precursor of the electrolyte, after forming an electrolyte layer by using a precursor of the electrolyte, heating is conducted at prescribed heating conditions that will be mentioned later, whereby an electrolyte layer of the invention can be produced.

The electrolyte layer can be produced by the electrostatic method.

If the solid electrolyte of the invention is in the form of a particle, it is preferred that the mean volume diameter (hereinafter referred to as the "particle diameter") be 0.01 μm or more and 500 μm or less.

In the invention, the particle size is preferably measured by a laser diffraction particle size distribution measuring method. In the laser diffraction particle size distribution measuring method, it is possible to measure the particle size distribution, without drying the composition. In the laser diffraction particle size distribution measuring method, the particle size distribution is measured by irradiating a group of laser particles in the composition, and analyzing the scattered light.

In the invention, the particle size is measured by using sulfide-based glass that is a dry solid electrolyte or its precursor.

As a measurement example, a measurement in which a laser diffraction particle size distribution measuring apparatus (Mastersizer 2000 manufactured by Malvern Instruments Co., Ltd.) is used will be explained.

First, in the dispersion chamber of the apparatus, 110 ml of toluene that has been dehydrated (manufactured by Wako Pure Chemical Industries, Ltd., product name: special grade) is put, and further, as a dispersant, a tertiary butyl alcohol (manufactured by Wako Pure Chemical Industries, Ltd., product name: special grade) is added in an amount of 6%.

After thoroughly mixing, a "precursor thereof or a solid electrolyte and dried" as the object to be measured is added to the mixture and the particle size is measured. The object to be measured is added such that the amount thereof is adjusted, in an operation screen defined by the Mastersizer 2000, such that the laser scattering density relative to the particle concentration falls within the prescribed range (10 to 20%). If the laser scattering intensity exceeds this range, multiple scattering occurs, whereby an accurate particle size distribution may not be obtained. If it is smaller than this range, an SN ratio is deteriorated, and as a result, accurate measurement may not be conducted. In the Mastersizer 2000, the laser scattering intensity is indicated based on the amount of the object to be measured. Therefore, an amount added that falls within the above-mentioned range of the laser scattering intensity may be found.

Although the optimum added amount of the object to be measured varies depending on the type of the ionic conductive substance or the like, generally, it is about 0.01 g to 0.05 g.

The solid electrolyte of the invention may be crystallized (glass ceramic) or amorphous (glass). If it is crystallized, an effect of increasing the ionic conductivity is exhibited. In the case of being amorphous, since the solid electrolyte is softer than the crystallized solid electrolyte, contact of the solid electrolytes and contact of the solid electrolyte with an active material or a conductive aid can be improved.

If the solid electrolyte (solid electrolyte (glass)) is amorphous, it is preferable that X in the above formula (A) or (A') be Br or Cl.

It is preferred that, in the solid electrolyte (glass), two temperature peaks (crystallization peaks) be observed by the following measurement method, that the two crystallization peaks be in the range of 150° C. or higher and 360° C. or lower, and that the distance between the two crystallization peaks be 20 to 150° C., preferably 20 to 100° C.

The crystallization temperature (peak) can be specified by means of a differential thermal thermogravimetric apparatus (TGA/DSC1, manufactured by Mettler Toledo International Inc.) or a differential scanning calorimeter (Diamond DSC, manufactured by PerkinElmer Inc.), and by heating about 20 mg of the solid electrolyte (glass) at a rate of 10° C./min.

It is preferred that the solid electrolyte (glass) have two crystallization peaks and these two crystallization peaks be in a range of 170° C. or higher and 330° C. or lower, and that the distance between the two crystallization peaks be 20 to 150° C.

It is further preferred that the two crystallization peaks be in a range of 170° C. or higher and 330° C. or lower, and that the distance between the two crystallization peaks be 30 to 140° C.

Further, it is particularly preferred that the solid electrolyte (glass) have two crystallization peaks and these two crystallization peaks be in a range of 175° C. or higher and 320° C. or lower, and that the distance between the two crystallization peaks be 30 to 140° C.

It is particularly preferred that the two crystallization peaks be in a range of 175° C. or higher and 320° C. or lower, and that the distance between the two crystallization peaks be 35 to 130° C. It is most preferred that the solid electrolyte have two crystallization peaks and that the two crystallization peaks be in a range of 180° C. or higher and 310° C. or lower, and that the distance between the two crystallization peaks be 40 to 120° C.

No specific restrictions are imposed on the method for producing the solid electrolysis of the invention. Hereinbelow, an explanation will be made on the example of the method for producing the solid electrolysis (glass) and the crystallized solid electrolyte according to the invention. The invention is not limited to the solid electrolyte produced by these production methods.

1. First Production Method

The solid electrolyte (glass) can be produced by allowing the raw material a and a compound containing a halogen element to react by a specific method.

(a) Raw Material a

As the raw material a, $Li_2S$ (lithium sulfide), $P_2S_3$ (phosphorus trisulfide), $P_2S_5$ (phosphorus pentasulfide), $SiS_2$ (silicon sulfide), $Li_4SiO_4$ (lithium orthosilicate), $Al_2S_3$ (aluminum sulfide), a simple body phosphorus (P), a simple body sulfur (S), silicon (Si), $GeS_2$ (germanium sulfide), $B_2S_3$ (arsenic trisulfide), $Li_3PO_4$ (lithium phosphate), $Li_4GeO_4$ (lithium germanate), $LiBO_2$ (lithium metaborate), $LiAlO_3$ (lithium aluminate), $Na_2S$ (sodium sulfide), $Na_4GeO_4$ (sodium germanate), $Na_4SiO_4$ (sodium orthosilicate), $Na_3PO_4$ (sodium phosphate), $NaBO_2$ (sodium metaborate), $NaAlO_3$ (sodium aluminate), and the like can be used. These compounds may be used in a mixture of two or more.

As the preferable raw material a, a combination of $Li_2S$ and $P_2S_5$, phosphor sulfide, a combination of a simple body of sulfur and a simple body of phosphorous, a combination of phosphor sulfide and a simple body of sulfur, a combination of phosphor sulfide, a simple body of sulfur and a simple body of phosphorous or the like can be given.

Hereinbelow, an explanation will be made on a case where the raw material a is a combination of lithium sulfide and phosphorous pentasulfide.

No specific restrictions are imposed on lithium sulfide. However, one having a high degree of purity is preferable. Lithium sulfide can be produced by a method stated in JP-A-07-330312, JP-A-09-283156, JP-A-2010-163356 and the Japanese Patent Application No. 2009-238952.

Specifically, lithium sulfide can be synthesized by a method in which lithium hydroxide and hydrogen sulfide are allowed to react at 70° C. to 300° C. in a hydrocarbon-based organic solvent to generate lithium hydrogen sulfide, and the reaction liquid is then hydrodesulfurized (JP-A-2010-163356).

Further, lithium sulfide can be synthesized by a method in which lithium hydroxide and hydrogen sulfide is allowed to react at 10° C. to 100° C. in an aqueous solvent to generate lithium hydrogen sulfide, and the reaction liquid is then hydrodesulfurized (Japanese Patent Application No. 2009-238952).

As for the lithium sulfide, the total content of a lithium salt of a sulfur oxide is preferably 0.15 mass % or less, more preferably 0.1 mass % or less, and that the content of N-methylaminobutyric acid lithium salt is preferably 0.15 mass % or less, more preferably 0.1 mass % or less. If the total content of a lithium salt of a sulfur oxide is 0.15 mass % or less, a solid electrolyte obtained by melt extraction or mechanical milling becomes a glassy electrolyte (complete amorphous). On the other hand, if the total content of a lithium salt of a sulfur oxide exceeds 0.15 mass %, the resulting electrolyte may be a crystallized product from the beginning.

If the content of N-methylaminobutyric acid lithium salt is 0.15 mass % or less, there is no fear that a deteriorated product of lithium N-methylaminolactate lowers the cycle property of a lithium ion battery. By using lithium sulfide of which the amount of impurities has been decreased in this way, a highly ionic conductive electrolyte can be obtained.

If lithium sulfide is produced based on JP-A-H07-330312 and JP-H09-283156, since lithium sulfide contains a lithium salt of a sulfur oxide or the like, it is preferable to conduct purification.

On the other hand, lithium sulfide that is produced by a method described in JP-A-2010-163356 may be used without purification, since the content of a lithium salt of a sulfur oxide or the like is significantly small.

As preferable purification methods, a purification method described in WO2005/40039 or the like can be given. Specifically, lithium sulfide obtained as above is washed in an organic solvent at a temperature of 100° C. or higher.

No specific restrictions are imposed on phosphorous pentasulfide ($P_2S_5$) as long as it is produced and sold on the industrials basis.

(b) Compound Comprising a Halogen Element

As the compound comprising a halogen element, a compound represented by the following formula (E) can be used. One compound may be used or a plurality of compounds may be used.

$$Y-X \quad\quad\quad (E)$$

In the formula (E), Y is an alkali metal such as lithium, sodium and potassium. Lithium and sodium are preferable, with lithium being particularly preferable.

X is the same as X in the formula (C).

As compounds comprising a halogen element, NaI, NaF, NaCl, NaBr, LiI, LiF, LiCl or LiBr is preferable.

As compounds comprising a halogen element, a compound represented by the following formula (E') can also be used. One compound may be used or a plurality of compounds may be used.

$$M_wX_x \quad\quad\quad (E')$$

In the formula (E'), M is Li, B, Al, Si, P, S, Ge, As, Se, Sn, Sb, Te, Pb or Bi. P or Li is particularly preferable. w is an arbitral integer of 1 to 2, and x is an arbitral integer of 1 to 10.

X is the same as X in the formula (C).

As compounds comprising a halogen element, specific examples include LiF, LiCl, LiBr, LiI, $BCl_3$, $BBr_3$, $BI_3$, $AlF_3$, $AlBr_3$, $AlI_3$, $AlCl_3$, $SiF_4$, $SiCl_4$, $SiCl_3$, $Si_2Cl_6$, $SiBr_4$, $SiBrCl_3$, $SiBr_2Cl_2$, $SiI_4$, $PF_3$, $PF_5$, $PCl_3$, $PCl_5$, $POCl_3$, $PBr_3$, $POBr_3$, $PI_3$, $P_2Cl_4$, $P_2I_4$, $SF_2$, $SF_4$, $SF_6$, $S_2F_{10}$, $SCl_2$, $S_2Cl_2$, $S_2Br_2$, $GeF_4$, $GeCl_4$, $GeBr_4$, $GeI_4$, $GeF_2$, $GeCl_2$, $GeBr_2$, $GeI_2$, $AsF_3$, $AsCl_3$, $AsBr_3$, $AsI_3$, $AsF_5$, $SeF_4$, $SeF_6$, $SeCl_2$, $SeCl_4$, $Se_2Br_2$, $SeBr_4$, $SnF_4$, $SnCl_4$, $SnBr_4$, $SnI_4$, $SnF_2$, $SnCl_2$, $SnBr_2$, $SnI_2$, $SbF_3$, $SbCl_3$, $SbBr_3$, $SbI_3$, $SbF_5$, $SbCl_5$, $PbF_4$, $PbCl_4$, $PbF_2$, $PbCl_2$, $PbBr_2$, $PbI_2$, $BiF_3$, $BiCl_3$, $BiBr_3$, $BiI_a$, $TeF_4$, $Te_2F_{10}$, $TeF_6$, $TeCl_2$, $TeCl_4$, $TeBr_2$, $TeBr_4$, $TeI_4$, NaI, NaF, NaCl and NaBr, with LiCl, LiBr, LiI, $PCl_5$, $PCl_3$, $PBr_5$ and $PBr_3$ being preferable. LiCl, LiBr, LiI and $PBr_3$ are more preferable.

In addition to a compound comprising the above-mentioned raw material a or the halogen element, a compound that lowers the glass transition temperature (vitrification accelerating agent) may be added. Examples of the vitrification accelerating agent include inorganic compounds such as $Li_3PO_4$, $Li_4SiO_4$, $Li_4GeO_4$, $Li_3BO_3$, $Li_3AlO_3$, $Li_3CaO_3$, $Li_3InO_3$, $Na_3PO_4$, $Na_4SiO_4$, $Na_4GeO_4$, $Na_3BO_3$, $Na_3AlO_3$, $Na_3CaO_3$ and $Na_3InO_3$.

(c) Method for Producing Solid Electrolyte (Glass)

Hereinbelow, an explanation will be made on the method for producing a solid electrolyte (glass) using lithium sulfide and phosphorus pentasulfide as the raw material a.

The amount ratio of lithium sulfide and phosphorous pentasulfide (molar ratio) is 60:40 to 90:10, preferably 65:35 to 85:15 or 70:30 to 90:10, further preferably 67:33 to 83:17 or 72:28 to 88:12, and particularly preferably 67:33 to 80:20 or 74:26 to 86:14. The amount ratio is particularly further preferably 70:30 to 80:20 or 75:25 to 85:15. Most preferably, the amount ratio of lithium sulfide and phosphorous pentasulfide (molar ratio) is 72:28 to 78:22 or 77:23 to 83:17.

The ratio (molar ratio) of the total of moles of lithium sulfide and moles of phosphorous pentasulfide relative to the compound comprising a halogen element is 50:50 to 99:1, preferably 55:45 to 95:5, with 60:40 to 90:10 being particularly preferable.

The ratio (molar ratio) of the total of moles of lithium sulfide and moles of phosphorous pentasulfide to the compound comprising a halogen element is preferably 50:50 to 99:1, more preferably 55:45 to 97:3 or 70:30 to 98:2, with 60:40 to 96:4 or 80:10 to 98:2 being further preferable. A ratio of 70:30 to 96:4 or 80:20 to 98:2 is particularly preferable. It is preferred that the total of moles of lithium sulfide and moles of phosphorous lithium sulfide and the compound comprising a halogen element be subjected to a heat treatment after mixing by a mechanical milling treatment.

A material obtained by mixing lithium sulfide, phosphorous pentasulfide and a compound comprising a halogen element with the above-mentioned amount ratio is treated by a melt extraction method, a mechanical milling method (hereinafter, the "mechanical milling" will be abbreviated as "MM"), a slurry method in which raw materials are reacted in an organic solvent or a solid-phase method or the like, whereby a solid electrolyte (glass) is produced.

(c-1) Melt Extraction Method

The melt extraction method is stated in JP-A-H06-279049 and WO2005/119706 or the like. Specifically, prescribed amounts of $P_2S_5$, $Li_2S$ and a compound comprising a halogen are mixed in a mortar to obtain a pellet-like mixture, and the mixture is then put in a carbon-coated quarts tube and vacuum sealed. After reacting at a specific reaction temperature, the tube is put in ice and quenched, whereby a solid electrolyte (glass) can be obtained.

The reaction temperature is preferably 400 to 1000° C., more preferably 800 to 900° C.

The reaction time is preferably 0.1 to 12 hours, more preferably 1 to 12 hours.

The quenching temperature of the above reaction product is normally 10° C. or less, preferably 0° C. or less. The cooling rate thereof is normally about 1 to 10000 K/sec, preferably 10 to 10000 K/sec.

(c-2) Mechanical Milling Method (MM Method)

The MM method is stated in JP-A-H11-134937, JP-A-2004-348972 and JP-A-2004-348973. Specifically, specific amounts of $P_2S_5$, $Li_2S$ and a compound comprising a halogen element are mixed in a mortar, and the resulting mixture is allowed to react for a prescribed period of time, whereby a solid electrolyte (glass) is obtained.

In the MM method using the above-mentioned raw materials, the reaction can be conducted at room temperature. Therefore, there is an advantage that thermal decomposition of the raw materials hardly occurs, whereby a solid electrolyte (glass) having the composition at the time of preparation can be obtained.

The MM method has an advantage that the solid electrolyte (glass) can be finely pulverized simultaneously with the production thereof.

In the MM method, various methods such as a rotation ball mill, a tumbling ball mill, a vibration roll mill and a planetary ball mill or the like can be used.

As for the conditions for the MM method, if a planetary ball mill is used, for example, the treatment may be conducted at a rotation speed of several tens to several hundred rotations per minute for a treatment time of 0.5 to 100 hours.

As described in JP-A-2010-90003, as for the ball for the ball mill, balls differing in diameter may be used in combination.

Further, as described in JP-A-2009-110920 or in JP-A-2009-211950, an organic solvent is added to the raw material to allow it to be a slurry, and the slurry is subjected to a MM treatment.

As described in JP-A-2010-30889, the temperature inside the mill at the time of the MM treatment may be adjusted.

It is preferred that the raw treatment temperature at the time of the MM treatment be 60° C. or higher and 160° C. or lower.

(c-3) Slurry Method

The slurry method is stated in WO2004/093099 and WO2009/047977.

Specifically, by reacting prescribed amounts of $P_2S_5$ particles, $Li_2S$ particles and a halogen in an organic solvent for a prescribed period of time, a solid electrolyte (glass) can be obtained.

It is preferred that a compound comprising a halogen be dissolved in an organic solvent, or be particles.

As described in JP-A-2010-140893, in order to promote the reaction, the reaction may be conducted while circulating the slurry containing the raw material between the beads mill and a reaction apparatus.

Further, as described in WO2009/047977, a reaction can be proceeded efficiently by pulverizing in advance lithium sulfate as the raw material.

In addition, as described in Japanese Patent Application No. 2010/270191, in order to increase the specific surface area, lithium sulfide as the raw material may be immersed in a polar solvent (methanol, diethyl carbonate, acetonitrile) having a dissolution parameter of 9.0 or less for a prescribed period of time.

The reaction temperature is preferably 20° C. or higher and 80° C. or lower, with 20° C. or higher and 60° C. or lower being more preferable.

The reaction time is preferably 1 hour or more and 16 hours or less, more preferably 2 hours or more and 14 hours or less.

The amount of an organic solvent may be an amount such that, lithium sulfide, lithium pentasulfide and a compound comprising a halogen as raw materials become in the state of a solution or a slurry by addition of an organic solvent. Normally, the amount of the raw materials (total amount) relative to 1 liter of the organic solvent is 0.001 kg or more and 1 kg or less. The amount of the raw material is preferably 0.005 kg or more and 0.5 kg or less, with 0.01 kg or more and 0.3 kg or less being particularly preferable.

Although no particular restrictions are imposed on the organic solvent, a non-protonic organic solvent is particularly preferable.

As the non-protonic organic solvent, a non-protonic non-polar organic solvent (for example, carbon hydroxide-based organic solvent), a non-protonic polar solvent (an amide compound, a lactam compound, a urea compound, an organic sulfur compound, a cyclic organic phosphor compound or the like, for example) can preferably used as a single solvent or a mixed solvent.

The hydrocarbon-based organic solvent, a saturated hydrocarbon, an unsaturated hydrocarbon or an aromatic d hydrocarbon can be used.

Examples of the saturated hydrocarbon include hexane, pentane, 2-ethylhexane, heptane, decane and cyclohexane.

As the unsaturated hydrocarbons, hexene, heptene, cyclohexene or the like can be given.

As the aromatic hydrocarbon, toluene, xylene, decalin, 1,2,3,4-tetrahydronaphthalene and the like can be given.

Of these, toluene and xylene are particularly preferable.

As the raw material of the solid electrolyte of the invention, one that is soluble in the organic solvent such as phosphorous tribromide can be given. The raw material is suitable for being produced by using the slurry method.

For example, although lithium sulfide is not dissolved in an organic solvent, phosphorus tribromide is soluble in an organic solvent. Therefore, if lithium sulfide, phosphorous pentasulfide and phosphorous bromide are used as raw materials, reactivity is increased as compared with the case where all raw materials are not dissolved in an organic solvent. As a result, the reaction time can be shortened, whereby a solid electrolyte (glass) having a high degree of purity with a small amount of a product remaining unreacted can be obtained.

It is preferred that the hydrocarbon-based solvent be dehydrated in advance. Specifically, as the water content, 100 wt. ppm or less is preferable, with 30 wt. ppm or less being particularly preferable.

According to need, other solvents may be added to the hydrocarbon-based solvent. Specific examples thereof include ketones such as acetone and methyl ethyl ketone, ethers such as tetrahydrofuran, alcohols such as ethanol and butanol, esters such as ethyl acetate and halogenated hydrocarbons such as dichloromethane and chlorobenzene.

(c-4) Solid Phase Method

The solid phase method is stated in "H-J, Deiseroth, et. al., Angew. Chem. Int. Ed. 2008, 47, 755-758", for examples. Specifically, specific amounts of $P_2S_5$, $Li_2S$ and a compound comprising a halogen are mixed in a mortar, followed by heating at 100 to 900° C., whereby a solid electrolyte (glass) is obtained.

The production conditions such as the temperature conditions, the treatment time, and the charged amount or the like of the melt extraction method, the MM method, the slurry method and the solid phase method can be appropriately adjusted according to equipment or the like.

As the method for producing a solid electrolyte (glass), the MM method, the slurry method or the solid phase method is preferable. Due to capability of production at a low cost, the MM method and the slurry method are more preferable, with the slurry method being particularly preferable.

In any of the melt extraction method, the MM method, the slurry method and the solid phase method, the order of mixing may be such that the composition of the final precursor is in the above-mentioned range. For example, if it is the mechanical milling method, milling may be conducted after milling all of $LiS_2$, $P_2S_5$ and LiBr; milling may be conducted after milling $Li_2S$ and $P_2S_5$, following by further milling after addition of LiBr; milling may be conducted after milling LiBr and $P_2S_5$, following by further milling after addition of $Li_2S$; or milling may be conducted after milling $Li_2S$ and LiBr, followed by further milling after addition of $P_2S_5$. Alternatively, milling may be conducted in such a manner that a mixture obtained by mixing and milling $Li_2S$ and LiBr and a mixture obtained by mixing and milling LiBr and $P_2S_5$ are mixed, followed by further milling.

In addition to the methods mentioned above, when mixing is conducted twice or more, two or more different methods may be used in combination. For example, a treatment may be conducted in such a manner that, after subjecting $Li_2S$ and $P_2S_5$ to a mechanical milling, LiBr is mixed, and the treatment is conducted by the solid phase method. Alternatively, a product obtained by treating $Li_2S$ and $P_2S_5$ by the solid phase method and a product obtained by treating $P_2S_5$ and LiBr by the melt extraction method are mixed, and the resulting mixture is treated by the slurry method, whereby a solid electrolyte (glass) is obtained.

If the first solid electrolyte has a peak in the first peak region in the $^{31}$P-NMR, it is preferred that the solid electrolyte (glass) do not have a peak in the first peak region in the $^{31}$P-NMR and the peak appear by the heat treatment mentioned later.

(2) Production of Crystallized Solid Electrolyte (Glass Ceramics)

A crystallized solid electrolyte (glass) is obtained by subjecting the solid electrolyte (glass) (sulfide glass) to a heat treatment. It is preferred that the heat treatment be conducted at a dew point of −40° C. or less, more preferably at a dew point of −60° C. or less.

The pressure at the time of heating may be normal pressure or reduced pressure.

The atmosphere may be air or inert gas.

Further, as described in JP-A-2010-186744, heating may be conducted in a solvent.

The heating temperature is preferably equal to or higher than the glass transition temperature (Tg) of the solid electrolyte (glass) and the crystallization temperature (Tc) of the solid electrolyte+100° C. or less. If the heating temperature is less than the Tg of the solid electrolyte (glass), the production time may be significantly long. On the other hand, if the heating temperature exceeds (Tc+100° C.), the resulting solid electrolyte (glass ceramics) may contain impurities, resulting in a lowered ionic conductivity.

The heating temperature is more preferably (Tg+5° C.) or more and (Tg+90° C.) or less, further preferably (Tg+10° C.) or more and (Tc+80° C.) or less.

For example, the heating temperature is 150° C. or higher and 360° C. or lower, preferably 160° C. or higher and 350° C. or lower, more preferably 180° C. or higher and 310° C. or lower, further preferably 180° C. or higher and 290° C. or lower, and particularly preferably 190° C. or higher and 270° C. or lower.

If two peaks appear in the measurement of thermal properties, the peak temperature at the low temperature side is taken as Tc, and the heat treatment is preferably conducted at a temperature between the Tc at the low temperature side and the secondary crystallization peak (Tc2) at the high temperature side.

The crystallization temperature (peak) can be specified by the differential thermal-thermogravimetric measurement or the like, as mentioned above.

In the meantime, the crystallization temperature or the like may vary by the heating rate or the like, Tc measured by a rate close to the heating rate at the time of the heat treatment is required to be used as a standard. Therefore, when a treatment is conducted at a heating rate other than that given in the Examples, although the optimum heat treatment temperature varies, it is preferable to conduct a heat treatment at the above-mentioned conditions with the Tc measured by the heating rate for the heat treatment is taken as the standard.

The heating time is 0.005 minute or more and 10 hours or less, further preferably 0.005 minute or more and 5 hours or less, and particularly preferably 0.01 minute or more and 3 hours or less. If the heating time is shorter than 0.005 minute, the electrolyte of the invention contains a large amount of a solid electrolyte (glass), thereby leading to lowering in ionic conductivity. If the heating time exceeds 10 hours, impurities or the like may be generated in the crystallized solid electrolyte, resulting in lowering in ionic conductivity.

No specific restrictions are imposed on the heating method. Heating may be conducted slowly or rapidly to a prescribed temperature.

2. Second Production Method

The second production method is a method in which a halogen compound is further added to the solid electrolyte (glass) obtained by the above-mentioned first production method, and the resultant is heated at a prescribed temperature for a prescribed time.

It is preferred that the solid electrolyte (glass) and the halogen compound be mixed by a MM treatment or the like. The production method of a solid electrolyte (glass), the heating time of a material obtained by adding a halogen compound to the solid electrolyte (glass), the heating temperature or the like are the same as those for the first production method, and the details thereof are omitted.

As the halogen compound, a compound comprising a halogen element as in the case of the above-mentioned first production method can be used.

In the second production method, the total of the amount of the compound comprising a halogen element used as the raw material of the solid electrolyte (glass) and the amount of the halogen compound to be mixed with the solid electrolyte (glass) is the same as the amount of the compound comprising a halogen element used as the solid electrolyte (glass) in the first production method. The amount ratio of the compound comprising the halogen element as the raw material for the solid electrolyte (glass) and the halogen compound to be mixed with the solid electrolyte (glass) is not particularly restricted.

3. Third Production Method

In the third production method, by heating an electrolyte precursor 1 and the compound comprising a halogen element at a prescribed temperature for a prescribed time, a solid electrolyte is produced.

It is preferred that the electrolyte precursor 1 do not have a peak at 75.0 ppm or more and 80.0 ppm or less (first peak region) in the $^{31}$P-NMR, and be a compound that satisfies the following formula (F):

$$Li_aM_bP_cS_d \tag{F}$$

In the formula (F), M, a, b, c and d are as defined in the formula (A).

It is preferred that the electrolyte precursor 1 have a peak in a region of 81.0 ppm or more and 85.0 ppm or less in the $^{31}$P-NMR.

The third production method differs from the first production method in that the electrolyte precursor 1 is produced by without adding the compound comprising a halogen element to the raw material of the solid electrolyte (glass) and that the electrolyte precursor 1 and the compound comprising the halogen element are mixed, followed by heating at a prescribed temperature for a prescribed time.

That is, the third production method is the same as the first production method, except that the electrolyte precursor 1 [solid electrolyte (glass)] is produced by using only the raw material a and that a mixture of the electrolyte precursor 1 and the compound comprising a halogen element is heated at a prescribed temperature for a prescribed time. Therefore, the raw material a, the compound comprising a halogen element, the method for producing the electrolyte precursor 1 and production conditions of the solid electrolyte are the same as those in the above-mentioned first production method. Therefore, an explanation thereof is omitted.

If the raw material a of the electrolyte precursor 1 is lithium sulfide and phosphorus pentasulfide, the ratio (molar ratio) of lithium sulfide and phosphorous pentasulfide is 60:40 to 90:10, preferably 65:35 to 85:15 or 70:30 to 90:10, further preferably 67:33 to 83:17 or 72:28 to 88:12, particularly preferably 67:33 to 80:20 or 74:26 to 86:14. The molar ratio is particularly more preferably 70:30 to 80:20 or 75:25 to 85:15. Most preferably, the amount ratio is 72:28 to 78:22 or 77:23 to 83:17.

The amount ratio of the electrolyte precursor 1 and the compound comprising a halogen element (molar ratio) is 50:50 to 99:1, preferably 55:45 to 95:5, and particularly preferably 60:40 to 90:10. It is preferred that the electrolyte precursor 1 and the compound comprising a halogen element be subjected to a heat treatment after mixing by a MM treatment or the like.

The amount ratio (molar ratio) of the electrolyte precursor 1 and the compound comprising a halogen element is preferably 50:50 to 99:1, more preferably 55:45 to 97:3 or 70:30 to 98:2, further preferably 60:40 to 96:4 or 80:10 to 98:2, and particularly preferably 70:30 to 96:4 or 80:20 to 98:2. It is preferred that the electrolyte precursor 1 and the compound comprising a halogen element be subjected to a heat treatment after mixing by a MM treatment or the like.

Since it is hardly hydrolyzed and has a high ionic conductivity, the solid electrolyte of the invention is suitable as the constituent material of a battery such as a solid electrolyte layer or the like.

The solid electrolyte of the invention may be used as an electrolyte-containing material after mixing with a binder, a cathode active material, an anode active material, a conductive aid, or a the compound comprising a halogen element or an organic solvent or the like that are the same as those in the above-mentioned production method. The electrolyte-containing material is used as the constituent material of a battery such as a cathode, an electrolyte layer and a cathode or the like, and as a material for an element (layer) constituting the battery.

It suffices that the electrolyte-containing material of the invention comprise the solid electrolyte of the invention. Hereinbelow, examples of other constituting materials will be explained.

As the binder, a fluorine-containing resin such as polytetrafluoroethylene (PTFE), polyvinylidene fluoride (PVdF) and fluorine rubber, a thermoplastic resin such as polypropylene and polyethylene, an ethylene-propylene-diene monomer (EPDM), sulfonated EPDM, natural butyl rubber (NBR) or the like can be used singly or in a mixture of two or more. In addition, a cellulose-based binder as a water-based binder, a water dispersion of styrene-butadiene rubber (SBR) or the like can also be used.

As the cathode active material, a material into which lithium ions can be inserted or from which lithium ions can be removed or a known material as a cathode active material known in the field of a battery can be used.

For example, oxides such as $V_2O_5$, $LiCoO_2$, $LiNiO_2$, $LiMnO_2$, $LiMn_2O_4$, $Li(Ni_aCo_bMn_c)O_2$ (here, $0<a<1$, $0<b<1$, $0<c<1$, $a+b+c=1$), $LiNi_{1-Y}Co_YO_2$, $LiCo_{1-Y}Mn_YO_2$, $LiNi_{1-Y}Mn_YO_2$ (here, $0 \leq Y<1$), $Li(Ni_aCo_bMn_c)O_4(0<a<2$, $0<b<2$, $0<c<2$, $a+b+c=2$), $LiMn_{2-Z}Ni_ZO_4$, $LiMn_{2-Z}Co_ZO_4$ (here, $O<Z<2$), $LiCoPO_4$, $LiFePO_4$, bismuth oxide ($Bi_2O_3$), bismuth lead acid ($Bi_2Pb_2O_5$), copper oxide (CuO), vanadium oxide ($V_6O_{13}$), $Li_xCoO_2$, $Li_xNiO_2$, $Li_xMn_2O_4$, $Li_xFePO_4$, $Li_xCoPO_4$, $Li_xMn_{1/3}Ni_{1/3}Co_{1/3}O_2$, $Li_xMn_{1.5}Ni_{0.5}O_2$ or the like can be given. As the anode active material other than those mentioned above, as the sulfide-based anode material, for example, sulfur as a simple body (S), titanium sulfide ($TiS_2$), molybdenum sulfide ($MoS_2$), iron sulfide (FeS, $FeS_2$), copper sulfide (CuS), nickel sulfide ($Ni_3S_2$), lithium sulfide ($Li_2S$), an organic disulfide compound, a carbon disulfide compound and sulfur or the like can be used. S and $Li_2S$ having a high theoretical capacity can preferably be used.

An organic disulfide compound and a carbon sulfide compound will be exemplified below.

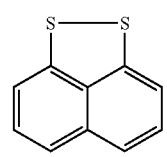

(1)

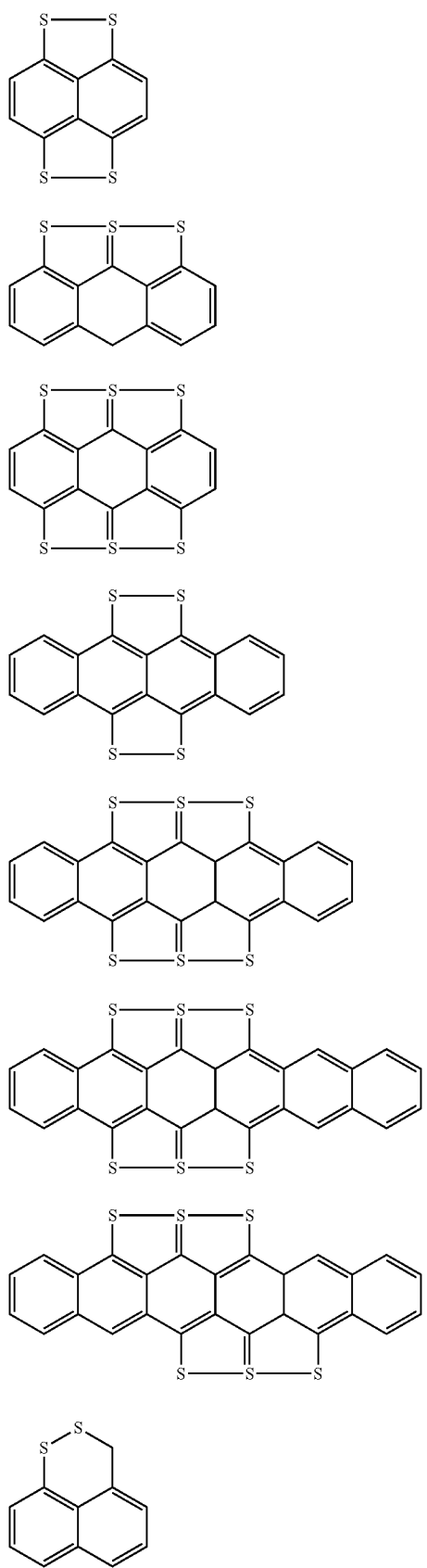
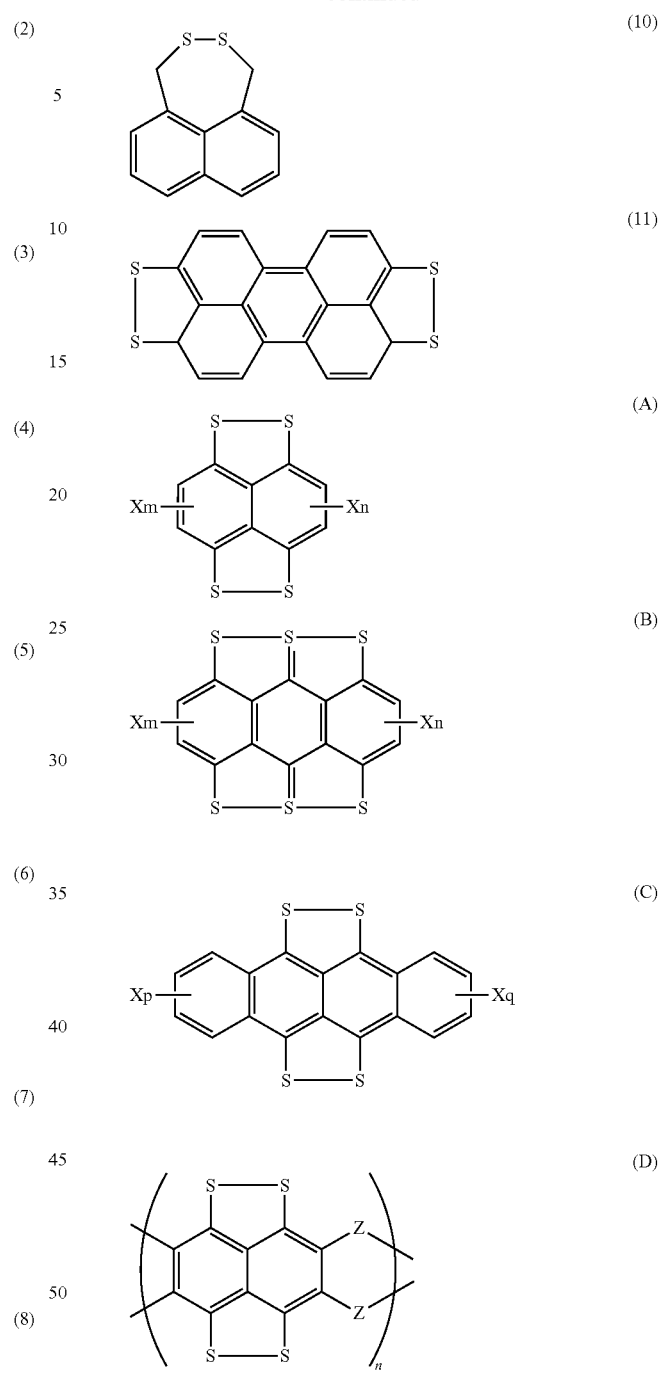
In the formulas (A) to (C), X is independently a substituent, n and m are independently an integer of 1 to 2, and p and q are independently an integer of 1 to 4.
In the formula (D), Z is independently —S— or —NH—, and n is an integer of 2 to 300 as a repeating cycle.
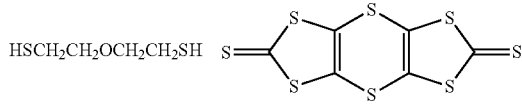

-continued

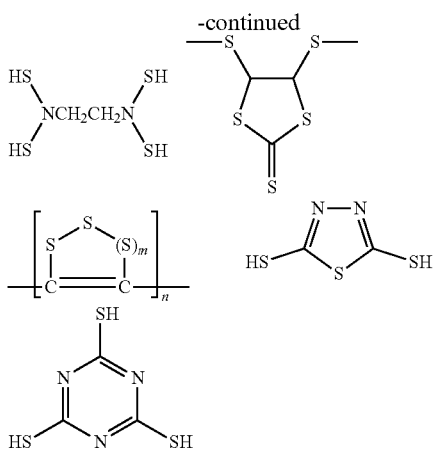

As the anode active material, a material into which a lithium ion can be inserted and from which a lithium ion can be removed and a material known in the field of a battery as the anode active material can be used.

For example, carbon materials, specifically, artificial graphite, graphite carbon fibers, resin baking carbon, pyrolytic vapor-grown carbon, coke, mesocarbon microbeads (MCMB), furfuryl alcohol resin-baked carbon, polyacene, pitch-based carbon fibers, vapor-grown carbon fibers, natural graphite and non-graphitizable carbon or the like can be given. The mixture thereof may be used. Artificial graphite is preferable.

Further, a metal itself such as metal lithium, metal indium, metal aluminum, metal silicon or the like or alloys with other elements or compounds can be used as an anode material. Among them, silicon, tin and metal lithium having a high theoretical capacity are preferable.

It suffices that the conductive aid have conductivity. The conductivity is preferably $1\times10^3$ S/cm or more, more preferably $1\times10^5$ S/cm or more.

As the conductive aid, a material selected from a carbon material, metal powder and a metal compound or a mixture of these can be given.

Specific examples of the conductive aid include a material containing at least one element selected from carbon, nickel, copper, aluminum, indium, silver, cobalt, magnesium, lithium, chromium, gold, ruthenium, platinum, beryllium, iridium, molybdenum, niobium, osmium, rhodium, tungsten and zinc. More preferably, a metal simple body, a mixture or a compound comprising a carbon simple body having a high conductivity, carbon, nickel, copper, silver, cobalt, magnesium, lithium, ruthenium, gold, platinum, niobium, osmium or rhodium can be given.

As specific examples of carbon materials, carbon black such as ketjen black, acetylene black, denka black, thermal black, channel black, graphite, carbon fibers and active carbon or the like can be given. They may be used singly or in combination of two or more.

Among these, acetylene black, denka black and ketjen black having high electron conductivity are preferable.

The electrolyte (sheet) of the invention comprises at least one of the above-mentioned solid electrolyte of the invention and an electrolyte material comprising the same. In addition to the solid electrolyte of the invention, according to the application, the binder as mentioned above may be contained. The electrolyte layer of the invention may comprises other electrolytes.

As other electrolytes, a polymer-based solid electrolyte, an oxide-based solid electrolyte or the above-mentioned electrolyte precursor 1 can be given.

No specific restrictions are imposed on the polymer-based electrolyte. For example, as disclosed in JP-A-2010-262860, materials that can be used as a polymer electrolyte such as a fluorine resin, polyethylene oxide, polyacrynitrile, polyacrylate or its derivatives, copolymers or the like can be given.

As the fluorine resin, for example, those comprising vinilidene fluoride (VdF), hexafluoropropylene (HFP), tetrafluoroethylene (TFE) or the derivatives thereof as structural units can be given. Specifically, homopolymers such as vinylidene polyfluoride (PVdF), polyhexafluoropropylene (PHFP), polytetrafluoroethylene (PTFE), binary copolymers or tertiary copolymers such as copolymer of VdF and HFP (hereinafter, these copolymers may be referred to as "P(VdF-HFP)") can be given.

As the oxide-based oxide electrolyte, LiN, LISICONs, Thio-LISICONs and crystals having a Perovskites structure such as $La_{0.55}Li_{0.35}TiO_3$, $LiTi_2P_3O_{12}$ having a NASICON structure, and electrolytes obtained by crystallization of these can be used.

The electrolyte layer according to another embodiment of the invention is an electrolyte layer produced by using the solid electrolyte or the electrolyte-containing material of the invention.

The electrolyte layer may be produced by applying a slurry comprising the solid electrolyte of the invention, a binder and a solvent or may be produced by the electrostatic screen printing by using particular solid electrolytes.

The electrolyte layer of the invention is preferable as the constituent layer of a battery.

In a first embodiment of the battery of the invention, at least one of a cathode layer, an electrolyte layer and an anode layer comprises the solid electrolyte of the invention. Each layer can be produced by a known method.

If the cathode layer, the anode layer or the electrolyte layer is produced by using the above-mentioned electrolyte precursor, it is possible to produce the battery of the invention by forming a layer using the electrolyte precursor, followed by heating at the prescribed heating conditions mentioned above.

It is preferred that the cathode layer contain a cathode active material, an electrolyte and a conductive aid. Further, it may contain a binder. Specific examples thereof are the same as those for the above-mentioned electrolyte-containing material.

In the cathode layer, the ratio of the cathode active material, the electrolyte and the conductive aid or the like is not specifically restricted, and a known amount ratio can be used.

It is preferred that the cathode layer have a thickness of 0.01 mm or more and 10 mm or less.

The cathode layer can be produced by a known method. For example, it can be produced by a coating method, an electrostatic method (electrostatic spray method, electrostatic screen method or the like).

It is preferred that the anode layer contain an anode active material, an electrolyte and a conductive aid. Further, the anode layer may contain a binder. Specific examples thereof are the same as the examples of the above-mentioned electrolyte-containing material. The production method or the thickness is the same as in the case of the cathode.

The electrolyte layer contains an electrolyte and may also contain a binder. Specific examples thereof are the same as the examples of the above-mentioned electrolyte-containing material.

It is preferred that the solid electrolyte of the electrolyte layer be fused. Here, the "fused" means that part of the solid electrolyte particles is dissolved and a dissolved part is integrated with other solid electrolyte particles.

The electrolyte layer may be in the form of a plate of the solid electrolyte. It may include a case where part or all of the solid electrolyte particles are dissolved to be in the form of a plate.

It is preferred that the thickness of the electrolyte layer be 0.001 mm or more and 1 mm or less.

Since the electrolyte and the binder are the same as the cathode layer, an explanation thereof is omitted.

In the battery of the invention, in addition to the cathode layer, the electrolyte layer and the anode layer, it is preferred that a current collector be used. As the current collector, a known collector can be used. For example, a layer obtained by covering one that reacts with a sulfide-based solid electrolyte, such as Au, Pt, Al, Ti or Cu, with Au or the like, can be used.

In the battery according to the second embodiment of the invention, at least one of the cathode layer, the electrolyte layer and the anode layer is produced by using at least one of the solid electrolyte and the electrolyte-containing material according to the invention.

In this embodiment, it suffices that at least one of the cathode layer, the electrolyte layer and the anode layer be produced by using the solid electrolyte or the electrolyte-containing material of the invention. Other configurations are the same as those for the first embodiment mentioned above.

Hereinabove, as for the battery of the invention, an explanation is made on an example in which a lithium-based electrolyte is mainly used. The invention is not limited to a lithium ion battery. For example, an alkali metal (sodium or the like)-based electrolyte, a divalent cationic electrolyte (magnesium or the like) or the like may be used. In these cases, the advantageous effects of the invention can be obtained.

EXAMPLES

The invention will be explained in more detail with reference to the Examples. The method measuring a sample is as follows.

(1) Measurement of $^{31}$P-NMR Spectrum

The measurement was conducted at room temperature with a 5 mm CP/MAS probe being attached to a JNM-CMXP 302 NMR apparatus manufactured by JEOL Ltd. The $^{31}$P-NMR spectrum was measured by the single pulse method (90° pulse 4 μs, magic angle spinning: 8.6 kHz).

The chemical shift was determined by using ammonium hydrogenphosphate as an external standard (1.3 ppm). The measurement range was from 0 ppm to 150 ppm.

(2) Ionic Conductivity (σ)

A sample was formed to a shape having a cross-section surface with a diameter of 10 mm (cross-section area S=0.785 cm$^2$), and a height (L) of 0.1 to 0.3 cm. Electrode terminals were attached to the upper and bottom side of the sample piece obtained, respectively, and the ionic conductivity was measured by the alternating current impedance method (frequency range: 5 MHz to 0.5 Hz, amplitude: 10 mV) to obtain a Cole-Cole plot. The real part Z' (Ω) of the point where −Z" (Ω) was the smallest near the right end of a circular arc observed in the higher-frequency region was set to the bulk resistance R (Ω) of an electrolyte. With the bulk resistance, according to the following formula, the ionic conductivity α (S/cm) was calculated.

$$R=\rho(L/S)$$

$$\sigma=1/\rho$$

In this application, the measurement was conducted with the distance of a lead being about 60 cm.

(3) Average Value of Hydrogen Sulfide Concentration (ppm)

The measurement device shown in FIG. 2 was used.

A sample for the measurement was sufficiently pulverized by means of a mortar in a glovebox with nitrogen under a circumstance of a dew point of −80° C. 0.1 g of the pulverized sample was encapsulated in a 100 ml-Schlenk bottle.

Next, air passed through water (wet air) was circulated in the Schlenk bottle at 500 ml/min. The temperature of wet air was 25° C., and the humidity thereof was 80 to 90%.

Gas released from the Schlenk bottle between 1 minute and 1 minute 45 seconds after the start of circulation was collected to obtain a first sample gas. The hydrogen sulfide concentration of the sample gas was calculated by determining quantitatively the sulfur content thereof by the ultraviolet fluorescent method using TS-100 (manufactured by Mitsubishi Chemical Analytech Co., Ltd). Meanwhile, the sample gas was analyzed qualitatively by means of gas chromatography by using Agilent 6890 (provided with a sulfur selective detector (SIEVERS355)). As a result, 99% or more of the sulfur content was confirmed to be a hydrogen sulfide gas.

For gases released from a Schlenk bottle between 5 minutes to 5 minutes 45 seconds after the starts of circulation, between 10 minutes to 10 minutes 45 seconds after the start of circulation, between 20 minutes to 20 minutes 45 seconds after the start of circulation and between 60 minutes to 60 minutes 45 seconds after the start of circulation, the measurement was conducted as in the case of the first sample gas.

The average value (ppm) of the hydrogen sulfide concentration was determined from the hydrogen sulfide concentrations and the measurement time.

Production Example 1

Production of Lithium Sulfide (Li$_2$S)

The production and purification of lithium sulfide were conducted in the same manner as in Examples described in WO2005/040039A1. Specifically, it was conducted as shown below.

(1) Production of Lithium Sulfide 3326.4 g (33.6 mol) of N-methyl-2-pyrrolidone (NMP) and 287.4 g (12 mol) lithium hydroxide were charged in a 10-liter autoclave with an impeller attached, and heated to 130° C. at 300 rpm. After heated, hydrogen sulfide was blown into the resulting liquid at a supply rate of 3 liter/min for 2 hours.

Subsequently, this reaction liquid was heated (200 cc/min) under nitrogen stream to allow a part of reacted hydrogen sulfide to be hydrodesulfurized. With an increase in temperature, water generated as a side product due to the reaction of the above-mentioned hydrogen sulfide and lithium hydroxide began to evaporate. The evaporated water was condensed using a condenser and removed to the outside the system. Since the temperature of the reaction liquid elevated while water was distilled away out of the system, heating was stopped at the point where the temperature reached 180° C. to maintain a certain temperature. After the completion of hydrodesulfurization (about 80 minutes), the reaction was completed to obtain lithium sulfide.

(2) Purification of Lithium Sulfide

After NMP in the 500-mL slurry reaction solution (NMP-lithium sulfide slurry) obtained in the above-mentioned (1) was subjected to decantation, 100 mL of dehydrated NMP was added thereto. Then, the mixture was stirred at 105° C. for about one hour. With the temperature being maintained, NMP was subjected to decantation. Further, 100 mL of NMP was added and stirred at 105° C. for about one hour, and NMP was subjected to decantation with the temperature being maintained. The same operation was repeated 4 times in total. After the completion of the decantation, lithium sulfide was dried at 230° C. (which is a temperature higher than the boiling point of NMP) under nitrogen stream and under ordinary pressure for 3 hours. The content of impurities contained in lithium sulfide obtained was measured.

The contents of sulfur oxides of lithium sulfite ($Li_2SO_3$), lithium sulfate ($Li_2SO_4$) and thiosulfuric acid dilithium salt ($Li_2S_2O_3$), and N-methyaminobutyric acid lithium salt (LMAB) were quantitated by means of ion chromatography. As a result, the total content of sulfur oxides was 0.13% by mass, and the content of LMAB was 0.07% by mass.

Production Example 2

Electrolyte Precursor (Sulfide-based Glass: $Li_2S/P_2S_5=75/25$): MM Method

An electrolyte precursor (sulfide-based glass) was produced using lithium sulfide which had been produced in Production Example 1 according to the method described in Example 1 in WO07/066539.

Specifically, 0.383 g (0.00833 mol) of lithium sulfide which had been produced in Production Example 1 and 0.618 g (0.00278 mol) of phosphorus pentasulfide (manufactured by Sigma-Aldrich Co. LLC.) were sufficiently mixed. The mixed powder, 10 zirconia balls and a planetary ball mill (P-7, manufactured by Fritsch) were charged in an alumina pot. The pot was completely closed and was filled with nitrogen, thereby to attain nitrogen atmosphere.

For the initial several tens of minutes, lithium sulfide and phosphorus pentasulfide were sufficiently mixed with the planetary ball mill being rotated at a low speed (100 rpm). Then, the rotation speed of the planetary ball mill was gradually raised until 370 rpm. The mechanical milling was conducted for 20 hours at a rotation speed of the planetary ball mill of 370 rpm to obtain white-yellow powder. The powder obtained was evaluated by X-ray measurement. As a result, the powder was confirmed to undergo vitrification (sulfide glass). In $^{31}$P-NMR measurement, a main peak appeared at 83.0 ppm.

The ionic conductivity was $1.3 \times 10^{-4}$ S/cm. The average value of hydrogen sulfide concentrations was 20.2 ppm.

Table 1 shows the result of $^{31}$P-NMR measurement, the ionic conductivity σ, and the average value of the hydrogen sulfide concentrations of the sample obtained. Table 2 shows the glass-transition temperature (Tg) and the crystallization temperature (Tc).

Here, the glass-transition temperature (Tg) and the crystallization temperature (Tc) were measured by using a differential scanning calorimetry (Diamond DSC manufactured by PerkinElmer Inc.) at 10° C./min.

Production Example 3

Electrolyte Precursor (Sulfide-based Glass: $Li_2S/P_2S_5=70/30$): MM Method

Sulfide-based glass was obtained in the same manner as in Production Example 2, except that the amount of lithium sulfide was changed to 0.325 g (0.00707 mol), and the amount of phosphorous pentasulfide was changed to 0.675 g (0.00303 mol). Table 1 shows the result of $^{31}$P-NMR measurement, the ionic conductivity σ, and the average value of the hydrogen sulfide concentration of the sample obtained. Tg and Tc are shown in Table 2.

Example 1

Solid Electrolyte (Sulfide-based Glass: $Li_2S/P_2S_5/LiI=63/21/16$): MM Method

Sulfide-based glass (solid electrolyte) was obtained in the same manner as in Production Example 2, except that 0.781 g of sulfide-based glass obtained in Production Example 2 and 0.221 g of lithium iodide (manufactured by Sigma-Aldrich Co. LLC.) were used as raw materials. Table 1 shows the result of $^{31}$P-NMR measurement, the ionic conductivity σ, and the average value of the hydrogen sulfide concentration of the sample obtained. Tg and Tc are shown in Table 2.

Example 2

Solid Electrolyte (Sulfide-based Glass: $Li_2S/P_2S_5/LiI=63/21/16$): MM Method

Sulfide-based glass (solid electrolyte) was obtained in the same manner as in Production Example 2, except that 0.299 g (0.0065 mol) of lithium sulfide, 0.482 g (0.00217 mol) of phosphorous pentasulfide (manufactured by Sigma-Aldrich Co. LLC.) and 0.221 g (0.00165 mol) of lithium iodide (manufactured by Sigma-Aldrich Co. LLC.) were used as raw materials. Table 1 shows the result of $^{31}$P-NMR measurement, the ionic conductivity σ, and the average value of the hydrogen sulfide concentration of the sample obtained. Table 2 shows Tg, Tc and Tc2.

Example 3

Solid Electrolyte (Sulfide-based Glass: $Li_2S/P_2S_5/LiI=52/17/31$): MM Method

Sulfide-based glass (solid electrolyte) was obtained in the same manner as in Production Example 2, except that 0.600 g of sulfide-based glass obtained in Production Example 2 and 0.400 g of lithium iodide were used as raw materials. Table 1 shows the result of $^{31}$P-NMR measurement, the ion conductivities σ, and the average value of the hydrogen sulfide concentration of the sample obtained. Table 2 shows Tg, Tc and Tc2.

Example 4

0.5 g of the solid electrolyte (sulfide-based glass) obtained in Example 1 was charged in a container made of SUS, and the container was set in an oven which was previously controlled to have a temperature of 210° C. After allowing to stand for 2 hours, the container was air-cooled to obtain a sulfide-based solid electrolyte. In $^{31}$P-NMR measurement, peaks appeared at 90 ppm and 77 ppm and the intensity ratio ($I_2/I_1$) was 2.5. Although peaks appeared also near 105 ppm and near 45 ppm, the intensities thereof were very small, i.e. less than one-fourth of that of the peak at 77 ppm. The ionic conductivity σ and the average value of the hydrogen sulfide concentration of the solid electrolyte obtained were shown in Table 3.

Example 5

0.5 g of the sulfide-based glass obtained in Example 1 was quickly sandwiched between two stainless plates heated in advance to 210° C. in an oven of which the temperature had been controlled to 210° C., and it was allowed to stand for 10 minutes. By sandwiching between the heated metal plates, the temperature of the sample reached 210° C. in about 2 minutes. Meanwhile, in Example 4, it took several ten minutes for a sample to reach a predetermined temperature. The result of $^{31}$P-NMR measurement, and the ionic conductivity σ and the average value of the hydrogen sulfide concentration for the solid electrolyte obtained by this operation were shown in Table 3.

Figure 4:
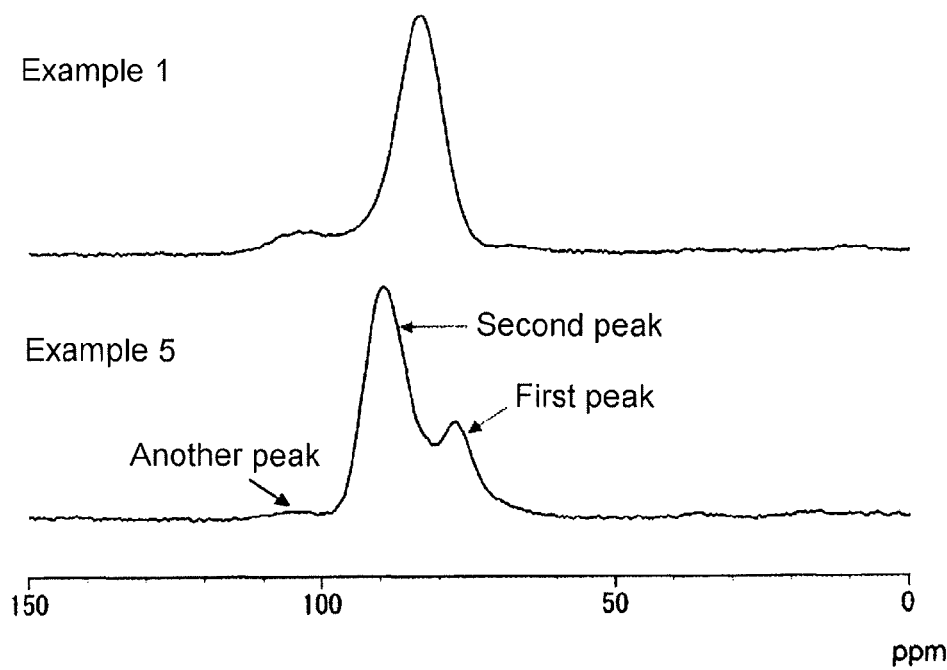
FIG. 4 is the $^{31}$P-NMR spectrum of the solid electrolyte obtained in Example 1 and the $^{31}$P-NMR spectrum of the solid electrolyte obtained in Example 5.

FIG. 4 shows $^{31}$P-NMR spectrum for the solid electrolyte obtained in Example 1 and the solid electrolyte obtained in Example 5.

Example 6

A solid electrolyte was produced in the same manner as in Example 5, except that the heat treatment was conducted at 250° C. and for 10 minutes. The result of $^{31}$P-NMR measurement, and the ionic conductivity σ and the average value of the hydrogen sulfide concentration for the solid electrolyte obtained were shown in Table 3.

Example 7

A solid electrolyte was produced in the same manner as in Example 4, except that the sulfide-based glass obtained in Example 2 was used. The result of $^{31}$P-NMR measurement, and the ionic conductivity σ and the average value of the hydrogen sulfide concentration for the solid electrolyte obtained were shown in Table 3.

Example 8

A solid electrolyte was produced in the same manner as in Example 5, except that the sulfide-based glass obtained in Example 2 was used. The result of $^{31}$P-NMR measurement, and the ionic conductivity σ and the average value of the hydrogen sulfide concentration for the solid electrolyte obtained were shown in Table 3.

Example 9

A solid electrolyte was produced in the same manner as in Example 5, except that the sulfide-based glass obtained in Example 3 was used. The result of $^{31}$P-NMR measurement, and the ionic conductivity σ and the average value of the hydrogen sulfide concentration for the solid electrolyte obtained were shown in Table 3.

Comparative Example 1

The operation was conducted in the same manner as in Example 4, except that the sulfide-based glass obtained in Example 2 was used, and the temperature of heat treatment was 300° C. The result of $^{31}$P-NMR measurement, and the ionic conductivity σ and the average value of the hydrogen sulfide concentration for the solid electrolyte obtained were shown in Table 3.

Comparative Example 2

The operation was conducted in the same manner as in Example 4, except that the sulfide-based glass obtained in Example 3 was used, and the temperature of heat treatment was 300° C. The result of $^{31}$P-NMR measurement, and the ionic conductivity σ and the average value of the hydrogen sulfide concentration for the solid electrolyte obtained were shown in Table 3.

TABLE 1

| | $Li_2S/P_2S_5/LiI$ (molar ratio) | NMR peak position ppm | Ionic conductivity S/cm | Average value of hydrogen sulfide concentration ppm | Remarks |
|---|---|---|---|---|---|
| Production Example 2 | 75/25/0 | 83 | $1.3 \times 10^{-4}$ | 20.2 | $Li_2S$ and $P_2S_5$ were treated by MM method. |
| Production Example 3 | 70/30/0 | 90 | $7.1 \times 10^{-4}$ | 308 | $Li_2S$ and $P_2S_5$ were treated by MM method. |
| Example 1 | 63/21/16 | 83 | $2.4 \times 10^{-4}$ | 12.9 | Production Example 2 and LiI were treated by MM method. |
| Example 2 | 63/21/16 | 83 | $5.3 \times 10^{-4}$ | 14.1 | $Li_2S$, $P_2S_5$ and LiI were treated by MM method. |
| Example 3 | 52/17/31 | 83 | $7.0 \times 10^{-4}$ | 18.4 | Production Example 2 and LiI were treated by MM method. |

TABLE 2

| | Tg °C. | Tc °C. | Tc2 °C. |
|---|---|---|---|
| Production Example 2 | 172 | 231 | — |
| Production Example 3 | 210 | 245, 260 | — |
| Example 1 | 152 | 189 | 305 |
| Example 2 | 155 | 192 | 301 |
| Example 3 | 130 | 162 | Unclear |

TABLE 3

| | Li$_2$S/P$_2$S$_5$/LiI (molar ratio) | Heat treatment conditions | NMR peak position(ppm) | | | Intensity ratio of peak | | Ionic conductivity S/cm | Average value of hydrogen sulfide concentration ppm |
|---|---|---|---|---|---|---|---|---|---|
| | | | First peak (I$_1$) | Second peak (I$_2$) | Other peak (Ic) | I$_2$/I$_1$ | Ic/I$_1$ | | |
| Example 4 | 63/21/16 | 210° C., 2 hours | 77 | 90 | 103 | 2.5 | 0.15 | 1.7 × 10$^{-3}$ | 13.5 |
| Example 5 | 63/21/16 | 210° C., 10 minutes | 78 | 91 | 104 | 2.4 | 0.11 | 1.8 × 10$^{-3}$ | 15.1 |
| Example 6 | 63/21/16 | 250° C., 10 minutes | 77 | 90 | 103 | 2.8 | 0.10 | 1.9 × 10$^{-3}$ | 14.5 |
| Example 7 | 63/21/16 | 210° C., 2 hours | 78 | 90 | 102 | 2.3 | 0.12 | 2.4 × 10$^{-3}$ | 13.8 |
| Example 8 | 63/21/16 | 210° C., 10 minutes | 78 | 91 | 103 | 2.1 | 0.15 | 2.5 × 10$^{-3}$ | 12.7 |
| Example 9 | 52/17/31 | 210° C., 10 minutes | 77 | 89 | 104 | 1.7 | 0.21 | 2.9 × 10$^{-3}$ | 17.8 |
| Com. Ex. 1 | 75/25 | 300° C., 2 hours | — | — | 83 | — | — | 7.4 × 10$^{-5}$ | 21.4 |
| Com. Ex. 2 | 70/30 | 300° C., 2 hours | — | 90 | — | — | — | 2.0 × 10$^{-3}$ | 317 |

All the sulfide-based solid electrolytes in Examples 1 to 9 had a very high ionic conductivity σ of 2×10$^{-4}$ S/cm or more.

In addition, all of the sulfide-based solid electrolytes in Examples 1 to 9 have an excellent hydrolysis resistance, whereby they can be used in an environment where the dew point is higher than ever before. Sulfide-based electrolytes with such an excellent hydrolysis resistance have never been known. Although the sulfide-based electrolyte in Comparative Example 1 has an excellent hydrolysis resistance, it is not suitable for applications as a battery due to its low ionic conductivity.

The sulfide-based electrolyte in Comparative Example 2 exhibits a high ionic conductivity. However, since the hydrolysis resistance thereof is poor, the dew point of a working environment need to be kept low.

Example 10

(1) Production of Solid Electrolyte (Sulfide-based Glass: Li$_2$S/P$_2$S$_5$/LiBr=64/21/14, MM Method)

A solid electrolyte (sulfide-based glass) was produced using lithium sulfide which had been produced in Production Example 1 according to the method described in Example 1 in WO07/066539.

0.333 g (0.00725 mol) of lithium sulfide, 0.532 g (0.00239 mol) of phosphorus pentasulfide (manufactured by Sigma-Aldrich Co. LLC.) and 0.140 g (0.00161 mol) of lithium bromide (manufactured by Sigma-Aldrich Co. LLC.) as raw materials were well mixed. The mixed powder, 10 zirconia balls each having a diameter of 10 mm and a planetary ball mill (P-7, manufactured by Fritsch) were charged in an alumina pot. The pot was completely closed and was filled with argon, thereby to attain argon atmosphere.

For initial several ten of minutes, lithium sulfide and phosphorus pentasulfide were sufficiently mixed with the planetary ball mill being rotated at a low speed (100 rpm). Then, the rotation speed of the planetary ball mill was gradually raised until 370 rpm. The mechanical milling was conducted for 20 hours at a rotation speed of the planetary ball mill of 370 rpm to obtain white-yellow powder as a solid electrolyte.

For the solid electrolyte obtained, the ionic conductivity (before heat treatment) and the crystallization temperature (Tc) by TG-DTA (Thermogravimeter) was measured. The results are shown in Table 4. The crystallization temperature was measured using TGA-DSC1 (manufactured by METTLER TOLEDO K.K.).

(2) Production of Solid Electrolyte (Sulfide-based Glass Ceramics)

0.5 g of the sulfide-based glass obtained was quickly sandwiched between two stainless plates heated in advance to 230° C. in an oven of which the temperature had been controlled to 230° C., and it was allowed to stand for 10 minutes, whereby a sulfide-based solid electrolyte was obtained. By sandwiching between the heated metal plates, the temperature of the sample reached 230° C. in about 2 minutes.

The ionic conductivity (after heat treatment) of the solid electrolyte obtained was evaluated. The result is shown in Table 4. The result of $^{31}$P-NMR spectrum for the sample obtained is shown in FIG. 5. The position of a first peak (appeared as a shoulder peak) was 77.7 ppm, the position of a second peak was 88.0 ppm, and the position of another peak was 107.7 ppm. I$_2$/I$_1$ was 2.57, and I$_c$/I$_1$ was 0.27.

Furthermore, a powder X-ray diffraction (XRD) pattern of the solid electrolyte obtained is shown in FIG. 7. The diffraction pattern was obtained by the following steps. The solid electrolyte sample obtained was shaped so as to have a cross section with 10 mmφ. The sample piece was attached to a sample jig for anaerobic measurement. The sample piece held in the jig was installed in Smartlab (manufactured by Rigaku Corporation) and irradiated with a X-ray beam (CuKα:λ=1.5418 Å).

As shown in FIG. 7, the solid electrolyte in Example 10 is found to have diffraction peaks at 2θ=15.7, 16.3, 21.4, 25.0, 30.1, 31.5 and 33.1 deg.

Comparative Example 3

(1) Production of Solid Electrolyte (Sulfide-based Glass: Li$_2$S/P$_2$S$_5$=75/25, MM Method)

Sulfide-based glass was produced in the same manner as in Example 10, except that as raw materials, 0.383 g (0.00833 mol) of lithium sulfide and 0.618 g (0.00278 mol) of phosphorous pentasulfide (manufactured by Sigma-Aldrich Co. LLC.) were used.

For the sulfide-based glass obtained, the crystallization temperature (Tc) was measured using TG-DTA. FIG. 4 shows the result. Meanwhile, the ionic conductivity of the sulfide-based glass obtained was $1.3 \times 10^{-4}$ S/cm.

(2) Production of Solid Electrolyte (Sulfide-based Glass Ceramics)

The sulfide-based glass powder obtained was heated to 260° C. at 10° C./min and then cooled to room temperature according to JP-A-2005-228570 to obtain a sulfide-based solid electrolyte.

The ionic conductivity of the solid electrolyte obtained was evaluated. The result is shown in Table 4.

Example 11

(1) Production of Solid Electrolyte (Sulfide-based Glass: $Li_2S/P_2S_5/LiBr=64/21/14$, MM Method)

Sulfide-based glass was produced in the same manner as in Example 10.

For the sulfide-based glass obtained, the ionic conductivity σ, and the crystallization temperature (Tc) (by TG-DTA) were measured. The results are shown in Table 4.

(2) Production of Solid Electrolyte (Sulfide-based Glass Ceramics)

0.5 g of the sulfide-based glass obtained was charged in a SUS container. The container was placed in an oven of which the temperature had been controlled to 230° C. in advance and was allowed to stand for 2 hours. After that, the container was air-cooled to produce a sulfide-based solid electrolyte. Meanwhile, it took several ten of minutes for the sample to reach a predetermined temperature.

The ionic conductivity σ of the solid electrolyte obtained was evaluated. The result is shown in Table 4.

Example 12

(1) Production of Solid Electrolyte (Sulfide-based Glass: $Li_2S/P_2S_5/LiBr=64/21/14$, MM Method)

Sulfide-based glass was produced in the same manner as in Example 10, except that 0.864 g of the sulfide-based glass obtained in Comparative Example 3 and 0.140 g of lithium bromide (manufactured by Sigma-Aldrich Co. LLC.) were used.

For the sulfide-based glass obtained, the ionic conductivity σ, and the crystallization temperature (Tc) (by TG-DTA) were measured. The results are shown in Table 4.

(2) Production of Solid Electrolyte (Sulfide-based Glass Ceramics)

A sulfide-based solid electrolyte was produced by subjecting the sulfide-base glass obtained to the same heat treatment as in Example 10.

The ionic conductivity of the solid electrolyte obtained was evaluated. The result is shown in Table 4.

Comparative Example 4

(1) Production of Electrolyte Precursor (Sulfide-based Glass: $Li_2S/P_2S_5=70/30$, MM Method)

Sulfide-based glass was produced in the same manner as in Example 10, except that the amount of lithium sulfide was changed to 0.325 g (0.00707 mol), and the amount of phosphorous pentasulfide was changed to 0.675 g (0.00303 mol).

For the sulfide-based glass obtained, the ionic conductivity σ, and the crystallization temperature (Tc) (by TG-DTA) were measured. The results are shown in Table 4.

(2) Production of Solid Electrolyte (Sulfide-based Glass Ceramics)

The sulfide-based glass powder obtained was heated to 260° C. at 10° C./min and then cooled to room temperature according to JP-A-2005-228570 to obtain a sulfide-based solid electrolyte.

The ionic conductivity of the solid electrolyte obtained was evaluated. The result is shown in Table 4.

Example 13

(1) Production of Solid Electrolyte (Sulfide-based Glass: $Li_2S/P_2S_5/LiBr=69/23/7.5$, MM Method)

Sulfide-based glass was produced in the same manner as in Example 10, except that as raw materials, 0.358 g (0.00779 mol) of lithium sulfide, 0.573 g (0.00258 mol) of phosphorous pentasulfide (manufactured by Sigma-Aldrich Co. LLC.) and 0.073 g (0.00084 mol) of lithium bromide (manufactured by Sigma-Aldrich Co. LLC.) were used.

For the sulfide-based glass obtained, the ionic conductivity σ, and the crystallization temperature (Tc) (by TG-DTA) were measured. The results are shown in Table 4.

(2) Production of Solid Electrolyte (Sulfide-based Glass Ceramics)

The sulfide-based glass obtained was subjected to the same heat treatment as in Example 10, except that the heating temperature was changed to 240° C. to obtain a sulfide-based solid electrolyte.

The ionic conductivity σ of the solid electrolyte obtained was evaluated. The result is shown in Table 4.

Example 14

(1) Production of Solid Electrolyte (Sulfide-based Glass: $Li_2S/P_2S_5/LiBr=58/19/23$, MM Method)

Sulfide-based glass was produced in the same manner as in Example 10, except that as raw materials, 0.302 g (0.00657 mol) of lithium sulfide, 0.482 g (0.00217 mol) of phosphorous pentasulfide (manufactured by Sigma-Aldrich Co. LLC.) and 0.220 g (0.00253 mol) of lithium bromide (manufactured by Sigma-Aldrich Co. LLC.) were used.

For the sulfide-based glass obtained, the ionic conductivity σ nd the crystallization temperature (Tc) (by TG-DTA) were measured. The results are shown in Table 4.

(2) Production of Solid Electrolyte (Sulfide-based Glass Ceramics)

The sulfide-based glass obtained was subjected to the same heat treatment as in Example 10, except that the heating temperature was changed to 220° C. to obtain a sulfide-based solid electrolyte.

The ionic conductivity σ of the solid electrolyte obtained was evaluated. The result is shown in Table 4.

Example 15

(1) Production of Solid Electrolyte (Sulfide-based Glass: $Li_2S/P_2S_5/LiBr=52/17/31$, MM Method)

Sulfide-based glass was produced in the same manner as in Example 10, except that as raw materials, 0.270 g (0.00588 mol) of lithium sulfide, 0.431 g (0.00194 mol) of phosphorous pentasulfide (manufactured by Sigma-Aldrich Co. LLC.) and 0.302 g (0.00348 mol) of lithium bromide (manufactured by Sigma-Aldrich Co. LLC.) were used.

For the sulfide-based glass obtained, the ionic conductivity σ, and the crystallization temperature (Tc) (by TG-DTA) were measured. The results are shown in Table 4.

(2) Production of Solid Electrolyte (Sulfide-based Glass Ceramics)

The sulfide-based glass obtained was subjected to the same heat treatment as in Example 10, except that the heating temperature was changed to 200° C. to obtain a sulfide-based solid electrolyte.

The ionic conductivity σ of the solid electrolyte obtained was evaluated. The result is shown in Table 4.

(3) Evaluation of Average Value of Hydrogen Sulfide Concentration

For Examples 10 and 13, and Comparative Examples 3 and 4, the average value of the hydrogen sulfide concentrations was evaluated. The results are shown in Table 5.

(2) Production of Solid Electrolyte (Sulfide-based Glass Ceramics)

The sulfide-based glass obtained was subjected to the same heat treatment as in Example 10 to obtain a sulfide-based solid electrolyte.

The ionic conductivity σ of the solid electrolyte obtained was evaluated. The result is shown in Table 6.

(3) Evaluation of Average Value of Hydrogen Sulfide Concentration

For Example 16, the average value of the hydrogen sulfide concentrations was evaluated according to the above-mentioned method. The resulting value was 7.4 ppm.

TABLE 4

|  | $Li_2S/P_2S_5/LiBr$ (molar ratio) | Ionic conductivity before heat treatment (S/cm) | Tc (° C.) | Tc2 (° C.) | Heat treatment Temperature (° C.) | Ionic conductivity after heat treatment (S/cm) |
|---|---|---|---|---|---|---|
| Example 10 | 64/21/14 | $6.5 \times 10^{-4}$ | 210 | 267 | 230 | $2.1 \times 10^{-3}$ |
| Com. Ex. 3 | 75/25/0 | $1.3 \times 10^{-4}$ | 221 | — | 250 | $3.0 \times 10^{-4}$ |
| Example 11 | 64/21/14 | $6.5 \times 10^{-4}$ | 210 | 267 | 230 | $1.7 \times 10^{-3}$ |
| Example 12 | 64/21/14 | $2.8 \times 10^{-4}$ | 192 | 263 | 220 | $1.0 \times 10^{-3}$ |
| Com. Ex. 4 | 70/30/0 | $7.1 \times 10^{-4}$ | 258 | — | 260 | $2.1 \times 10^{-3}$ |
| Example 13 | 69/23/7.5 | $3.8 \times 10^{-4}$ | 217 | 273 | 240 | $1.1 \times 10^{-3}$ |
| Example 14 | 58/19/23 | $4.4 \times 10^{-4}$ | 192 | 270 | 220 | $1.7 \times 10^{-3}$ |
| Example 15 | 52/17/31 | $4.1 \times 10^{-4}$ | 176 | 262 | 200 | $3.9 \times 10^{-4}$ |

TABLE 5

|  | Average value of hydrogen sulfide concentration [ppm] |
|---|---|
| Example 10 | 8.0 |
| Example 13 | 18.7 |
| Com. Ex. 3 | 21.4 |
| Com. Ex. 4 | 317 |

All the sulfide-based solid electrolytes in Examples 10 to 15 had a very high ionic conductivity σ of $1 \times 10^{-4}$ S/cm or more. Since they had an excellent hydrolysis resistance, they can be used at a circumstance where the dew point is higher than ever before. Sulfide-based solid electrolytes having such an excellent hydrolysis resistance have not been known heretofore.

On the other hand, although the sulfide-based solid electrolyte in Comparative Example 3 has an excellent hydrolysis resistance, the ionic conductivity is low, and hence it is not to be suitable for battery applications. Although the sulfide-based solid electrolyte in Comparative Example 4 has a high ionic conductivity, the hydrolysis resistance is low, whereby the working environment is required to have a low dew point.

Example 16

(1) Production of Solid Electrolyte (Sulfide-based Glass: $Li_2S/P_2S_5/LiCl=64/21/14$, MM Method)

Sulfide-based glass was produced in the same manner as in Example 10, except that as raw materials, 0.359 g (0.00773 mol) of lithium sulfide, 0.574 g (0.00258 mol) of phosphorous pentasulfide (manufactured by Sigma-Aldrich Co. LLC.) and 0.072 g (0.00175 mol) of lithium chloride (manufactured by Sigma-Aldrich Co. LLC.) were used.

For the sulfide-based glass obtained, the crystallization temperature (Tc) was measured by TG-DTA. The result is shown in Table 6.

Example 17

(1) Production of Solid Electrolyte (Sulfide-based Glass: $Li_2S/P_2S_5/LiCl=69/23/7.5$, MM Method)

Sulfide-based glass was produced in the same manner as in Example 10, except that as raw materials, 0.373 g (0.00804 mol) of lithium sulfide, 0.596 g (0.00268 mol) of phosphorous pentasulfide (manufactured by Sigma-Aldrich Co. LLC.) and 0.036 g (0.00086 mol) of lithium chloride (manufactured by Sigma-Aldrich Co. LLC.) were used.

For the sulfide-based glass obtained, the crystallization temperature (Tc) was measured by TG-DTA. The result is shown in Table 6.

(2) Production of Solid Electrolyte (Sulfide-Based Glass Ceramics)

The sulfide-based glass obtained was subjected to the same heat treatment as in Example 10, except that the heating temperature was changed to 230° C. to obtain a sulfide-based solid electrolyte.

The ionic conductivity of the solid electrolyte obtained was evaluated. The result is shown in Table 6.

Example 18

(1) Production of Solid Electrolyte (Sulfide-based Glass: $Li_2S/P_2S_5/LiCl=58/19/23$, MM Method)

Sulfide-based glass was produced in the same manner as in Example 10, except that as raw materials, 0.341 g (0.00735 mol) of lithium sulfide, 0.546 g (0.00245 mol) of phosphorous pentasulfide (manufactured by Sigma-Aldrich Co. LLC.) and 0.119 g (0.00286 mol) of lithium chloride (manufactured by Sigma-Aldrich Co. LLC.) were used.

For the sulfide-based glass obtained, the crystallization temperature (Tc) was measured by TG-DTA. The result is shown in Table 6.

(2) Production of Solid Electrolyte (Sulfide-based Glass Ceramics)

The sulfide-based glass obtained was subjected to the same heat treatment as in Example 10, except that the heating temperature was changed to 230° C. to obtain a sulfide-based solid electrolyte.

The ionic conductivity of the solid electrolyte obtained was evaluated. The result is shown in Table 6.

Example 19

(1) Production of Solid Electrolyte (Sulfide-based Glass: $Li_2S/P_2S_5/LiCl=52/17/31$, MM Method)

Sulfide-based glass was produced in the same manner as in Example 10, except that as raw materials, 0.321 g (0.00691 mol) of lithium sulfide, 0.513 g (0.00230 mol) of phosphorous pehtasulfide (manufactured by Sigma-Aldrich Co. LLC.) and 0.171 g (0.00413 mol) of lithium bromide (manufactured by Sigma-Aldrich Co. LLC.) were used.

For the sulfide-based glass obtained, the crystallization temperature (Tc) was measured by TG-DTA. The result is shown in Table 6.

(2) Production of Solid Electrolyte (Sulfide-based Glass Ceramics)

The sulfide-based glass obtained was subjected to the same heat treatment as in Example 10, except that the heating temperature was changed to 230° C. to obtain a sulfide-based solid electrolyte.

The ionic conductivity σ of the solid electrolyte obtained was evaluated. The result is shown in Table 6.

TABLE 6

| | $Li_2S/P_2S_5/LiCl$ [molar ratio] | Tc [° C.] | Heat treatment temperature [° C.] | Ionic conductivity after heat treatment [S/cm] |
|---|---|---|---|---|
| Example 16 | 64/21/14 | 212 | 230 | $1.1 \times 10^{-3}$ |
| Example 17 | 69/23/7.5 | 218 | 230 | $6.2 \times 10^{-4}$ |
| Example 18 | 58/19/23 | 210 | 230 | $6.4 \times 10^{-4}$ |
| Example 19 | 52/17/31 | 208 | 230 | $6.4 \times 10^{-4}$ |

Example 20

(1) Production of Solid Electrolyte (Sulfide-based Glass: $Li_2S/P_2S_5/PBr_3=76/19/5$, MM Method)

In argon atmosphere, 0.388 g (0.00844 mol) of lithium sulfide produced in Production Example 1 and 0.471 g (0.00212 mol) of phosphorus pentasulfide (manufactured by Sigma-Aldrich Co. LLC.) were mixed so as to have a composition of $Li_2S/P_2S_5=80/20$ (mol/mol). Further, the mixture to which 0.160 g (0.00058 mol) of phosphorus tribromide was added dropwise was mixed well. Then, the mixture powder, zirconia balls and a planetary ball mill (P-7, manufactured by Fritsch) were charged in an alumina pot. The pot was completely closed with argon atmosphere being kept.

For initial several minutes, lithium sulfide, phosphorus pentasulfide and phosphorus tribromide were sufficiently mixed with the planetary ball mill being rotated at a low speed (100 rpm). Then, the rotation speed of the planetary ball mill was gradually raised until 370 rpm. The mechanical milling was conducted for 20 hours at a rotation speed of the planetary ball mill of 370 rmp to obtain powder. The solid electrolyte obtained was determined at 10° C./minute by using a thermogravimetry (TGA-DSC1 manufactured by METTLER TOLEDO K.K.). A crystallization peak appeared at 220° C. A second crystallization peak appeared around 287° C.

(2) Production of Solid Electrolyte (Sulfide-based Glass Ceramics)

0.5 g of the sulfide-based glass obtained was quickly sandwiched between two stainless plates which had been heated in advance to 240° C. in an oven of which the temperature had been controlled to 240° C., and was allowed to stand for 10 minutes, whereby a sulfide-based solid electrolyte was obtained. By sandwiching between the heated metal plates, the temperature of the sample reached 240° C. in about 2 minutes.

The ionic conductivity σ of the solid electrolyte obtained was evaluated as $8 \times 10^{-4}$ S/cm.

In $^{31}P$-NMR measurement for the sample obtained, the position of a first peak (appeared as a shoulder peak) was 78.3 ppm, the position of a second peak was 88.0 ppm, and the position of another peak was 107.9 ppm. $I_2/I_1$ was 2.40, and $I_c/I_1$ was 0.42.

The compound has a composition of $Li_{3.56}PS_{3.95}Br_{0.36}$.

(3) Evaluation of Average Value of Hydrogen Sulfide Concentration

The average value of hydrogen sulfide concentration was evaluated according to the above-mentioned method. The average concentration of hydrogen sulfide yield was 38.3 ppm, which was equal to that in Comparative Example 3 and a relatively low value.

INDUSTRIAL APPLICABILITY

The solid electrolyte and electrolyte-containing compound in the invention are suitable as a constituting material for a battery such as a cathode layer, an electrolyte layer and an anode electrode.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the Japanese patent applications claiming the priority under the Paris Convention to the invention are incorporated herein by reference in its entirety.

The invention claimed is:

1. A method of producing a crystallized solid electrolyte wherein the solid electrolyte has a peak in a peak region of 75.0 ppm or more and 80.0 ppm or less in a $^{31}P$-NMR spectrum, the method comprising:
   producing a solid electrolyte from a raw material and a compound comprising a halogen element; and
   heating the solid electrolyte to obtain the crystallized solid electrolyte;
   wherein the raw material comprises: (i) lithium sulfide and phosphorus sulfide, (ii) sulfur and phosphorus, (iii) phosphorus sulfide and sulfur, or (iv) phosphorus sulfide, sulfur, and phosphorus.

2. The method according to claim 1, wherein the compound comprising a halogen element is a compound represented by formula (E'):

$$M_v X_x \qquad (E')$$

where:
M is Li, B, Al, Si, P, S, Ge, As, Se, Sn, Sb, Te, Pb, or Bi;
X is F, Cl, Br, or I;
w is an integer of 1 or 2; and
x is an integer of from 1 to 10.

3. The method according to claim 1, wherein M is P, and X is Br, I, or Cl.

4. The method according to claim 1, wherein M is Li, and X is Br, I, or Cl.

5. The method according to claim 1, wherein M is Li, and X is Br or Cl.

6. The method according to claim 1, wherein the solid electrolyte is amorphous and has two crystallization peaks in a thermo gravimetric-differential thermal measurement.

7. The method according to claim 6, wherein heating the solid electrolyte comprises heating at a temperature between the temperatures indicated by the two crystallization peaks.

8. The method according to claim 6, wherein the two crystallization peaks appear in a range of 150° C. or higher and 360° C. or lower.

9. The method according to claim 6, wherein a distance between the two crystallization peaks is 20 to 100° C.

10. The method according to claim 1, wherein heating the solid electrolyte comprises heating at a dew point of −40° C. or less.

11. The method according to claim 1, wherein heating the solid electrolyte comprises heating for a period of 0.005 minutes to 10 hours.

12. The method according to claim 1, wherein:
the raw material comprises lithium sulfide and phosphorus pentasulfide; and
a molar ratio of lithium sulfide to phosphorus pentasulfide is 60:40 to 90:10.

13. The method according to claim 12, wherein a molar ratio of total moles of lithium sulfide and phosphorus pentasulfide to total moles of the compound comprising a halogen element is 50:50 to 99:1.

14. The method according to claim 12, wherein producing the solid electrolyte comprises treating lithium sulfide, phosphorus pentasulfide, and the compound comprising a halogen element by a melt extraction method, a mechanical milling method, a slurry method, a solid-phase method, or by a combination of two or more such methods.

15. The method according to claim 12, wherein producing the solid electrolyte comprises:
(a) milling after mixing lithium sulfide, phosphorus pentasulfide, and the compound comprising a halogen element;
(b) milling lithium sulfide and phosphorus pentasulfide, followed by further milling after adding the compound comprising a halogen element;
(c) milling the compound comprising a halogen element and phosphorus pentasulfide, followed by further milling after adding lithium sulfide;
(d) milling lithium sulfide and the compound comprising a halogen element, followed by further milling after adding phosphorus pentasulfide; or
(e) mixing a first mixture obtained by mixing and milling lithium sulfide and the compound comprising a halogen element and a second mixture obtained by mixing and milling the compound comprising a halogen element and phosphorus pentasulfide, followed by further milling.

16. The method according to claim 12, wherein producing the solid electrolyte comprises:
subjecting lithium sulfide and phosphorus pentasulfide to mechanical milling, mixing the compound comprising a halogen element, and treating the resulting mixture by the solid phase method; or
mixing a first product obtained by treating lithium sulfide and phosphorus pentasulfide by the solid phase method and a second product obtained by treating phosphorus pentasulfide and the compound comprising a halogen element by the melt extraction method are mixed, and treating the resulting mixture by the slurry method.

17. The method according to claim 12, wherein a total content of a lithium salt of a sulfur oxide of lithium sulfide is 0.15 mass % or less.

* * * * *